United States Patent
Son

(10) Patent No.: US 12,468,338 B2
(45) Date of Patent: Nov. 11, 2025

(54) DISPLAY DEVICE

(71) Applicant: LG Display Co., Ltd., Seoul (KR)

(72) Inventor: JiCheol Son, Hanam-si (KR)

(73) Assignee: LG Display Co., Ltd., Seoul (KR)

( * ) Notice: Subject to any disclaimer, the term of this patent is extended or adjusted under 35 U.S.C. 154(b) by 179 days.

(21) Appl. No.: 18/464,722

(22) Filed: Sep. 11, 2023

(65) Prior Publication Data

US 2024/0210989 A1 Jun. 27, 2024

(30) Foreign Application Priority Data

Dec. 26, 2022 (KR) .......................... 10-2022-0184182

(51) Int. Cl.
*G06F 1/16* (2006.01)

(52) U.S. Cl.
CPC .......... *G06F 1/1616* (2013.01); *G06F 1/1652* (2013.01); *G06F 1/1656* (2013.01)

(58) Field of Classification Search
CPC .... G06F 1/1616; G06F 1/1652; G06F 1/1656; G06F 9/301; G06F 9/33; G06F 9/335
See application file for complete search history.

(56) References Cited

U.S. PATENT DOCUMENTS

| | | | |
|---|---|---|---|
| 10,802,311 B2 | 10/2020 | Kim et al. | |
| 11,195,440 B2 | 12/2021 | Lee et al. | |
| 2013/0216740 A1* | 8/2013 | Russell-Clarke | B21D 31/04 |
| | | | 219/121.72 |
| 2017/0263690 A1* | 9/2017 | Lee | H10D 86/60 |
| 2019/0334114 A1* | 10/2019 | Park | H05K 5/0226 |
| 2021/0153363 A1* | 5/2021 | Cao | H10K 77/111 |
| 2021/0202879 A1 | 7/2021 | Park et al. | |
| 2022/0015253 A1 | 1/2022 | Park et al. | |
| 2022/0093867 A1 | 3/2022 | Hwang et al. | |
| 2022/0189349 A1 | 6/2022 | Roh et al. | |
| 2022/0199922 A1 | 6/2022 | Choi et al. | |
| 2022/0303373 A1 | 9/2022 | Kang et al. | |
| 2022/0312604 A1* | 9/2022 | Feng | B32B 15/09 |
| 2022/0343807 A1* | 10/2022 | Lee | G09F 9/301 |
| 2023/0111654 A1* | 4/2023 | Li | G09F 9/301 |
| | | | 361/807 |
| 2023/0221759 A1* | 7/2023 | Kim | G06F 1/1643 |
| | | | 361/679.01 |

FOREIGN PATENT DOCUMENTS

| | | |
|---|---|---|
| KR | 10-2018-0047590 A | 5/2018 |
| KR | 10-2018-0128548 A | 12/2018 |
| KR | 10-2019-0075502 A | 7/2019 |
| KR | 10-2021-0043029 A | 4/2021 |

(Continued)

*Primary Examiner* — Abhishek M Rathod
(74) *Attorney, Agent, or Firm* — Seed Intellectual Property Law Group LLP

(57) ABSTRACT

A display device includes a folding area and a non-folding area. The display device further includes a display panel and a bottom plate disposed under the display panel to support the display panel. The bottom plate may include different materials. The bottom plate may also include a first area overlapping the folding area of the display device and a second area overlapping the non-folding area of the display device. The first area includes a pattern part and a non-pattern part between the pattern part and the second area.

12 Claims, 22 Drawing Sheets

(56) References Cited

FOREIGN PATENT DOCUMENTS

| KR | 10-2021-0053582 A | 5/2021 |
|----|-------------------|--------|
| KR | 10-2021-0083883 A | 7/2021 |
| KR | 10-2022-0007801 A | 1/2022 |
| KR | 10-2022-0038205 A | 3/2022 |
| KR | 10-2022-0044561 A | 4/2022 |
| KR | 10-2022-0078463 A | 6/2022 |
| KR | 10-2022-0085201 A | 6/2022 |
| KR | 10-2022-0090038 A | 6/2022 |

* cited by examiner

DISPLAY DEVICE

CROSS-REFERENCE TO RELATED APPLICATIONS

This application claims the priority of Korean Patent Application No. 10-2022-0184182 filed on Dec. 26, 2022, in the Korean Intellectual Property Office, the disclosure of which is incorporated herein by reference.

BACKGROUND

Technical Field

The present disclosure relates to a display device, and more particularly, to a foldable display device which may be folded or unfolded.

Description of the Related Art

As society advances to the information-oriented society, the field of display devices for processing and displaying a massive amount of information has rapidly advanced. Display devices have a wide range of diverse applications, including personal digital assistants, as well as monitors of computers and televisions. Display devices with larger display area and reduced volume and weight are being studied.

Recently, flexible display devices capable of displaying an image even when bent or folded have received attention as next-generation display devices. By using a plastic thin film transistor substrate, the flexible display devices may be categorized into unbreakable display devices having high durability and bendable display devices which are not broken, but are bendable. Also, the flexible display devices may be categorized into rollable display devices capable of being rolled and foldable display devices. Such flexible display devices are good in space usability, interior, and design and may be applied to various application fields.

BRIEF SUMMARY

An object to be achieved by the present disclosure is to provide a display device with secured foldability and reduced weight.

Another object to be achieved by the present disclosure is to provide a display device which may suppress deformation caused by a stress.

Objects of the present disclosure are not limited to the above-mentioned objects, and other objects, which are not mentioned above, can be clearly understood by those skilled in the art from the following descriptions.

According to an aspect of the present disclosure, the display device includes a display panel including a folding area and a non-folding area. Also, the display device includes a bottom plate disposed under the display panel to support the display panel. The bottom plate may include different materials from each other.

Other detailed matters of the exemplary embodiments are included in the detailed description and the drawings.

According to the present disclosure, a total weight of a bottom plate and a display device may be reduced compared to a case where the entire bottom plate is made of a metal material.

According to the present disclosure, a first area and a second area of the bottom plate are connected to each other through a protrusion. Therefore, a contact area between the first area and the second area increases, and thus, a connecting force between the first area and the second area may be enhanced.

According to the present disclosure, it is possible to suppress deformation of the display device caused by a stress.

According to the present disclosure, the display device may be lightweight by replacing harmful materials and thus reducing the weight.

The effects according to the present disclosure are not limited to the contents exemplified above, and more various effects are included in the present specification.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
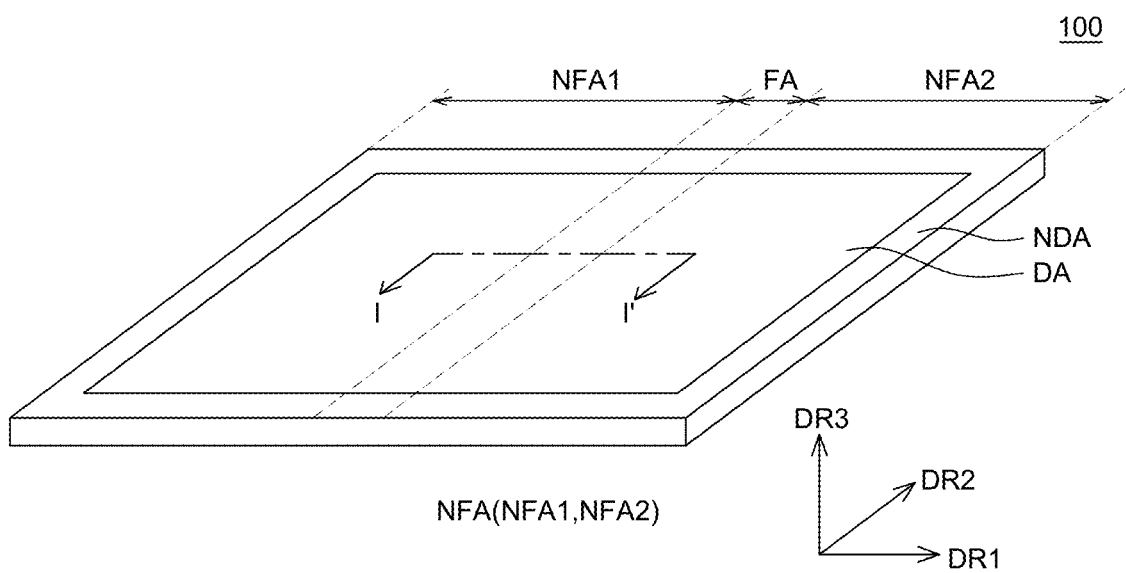
FIG. 1 is a perspective view schematically illustrating a display device according to exemplary embodiments of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on," "above," "below," and "next", one or more parts may be positioned between the two parts unless the terms are used with the term "immediately" or "directly."

When an element or layer is disposed "on" another element or layer, another layer or another element may be interposed directly on the other element or therebetween.

And, when it is described using the terms such as 'contact' or 'connect', it may include 'contact' or 'connect' through one or more other components located between two components unless the terms are used with the term 'immediately' or 'directly.'

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, the present disclosure will be described in detail with reference to accompanying drawings.

Figure 2:
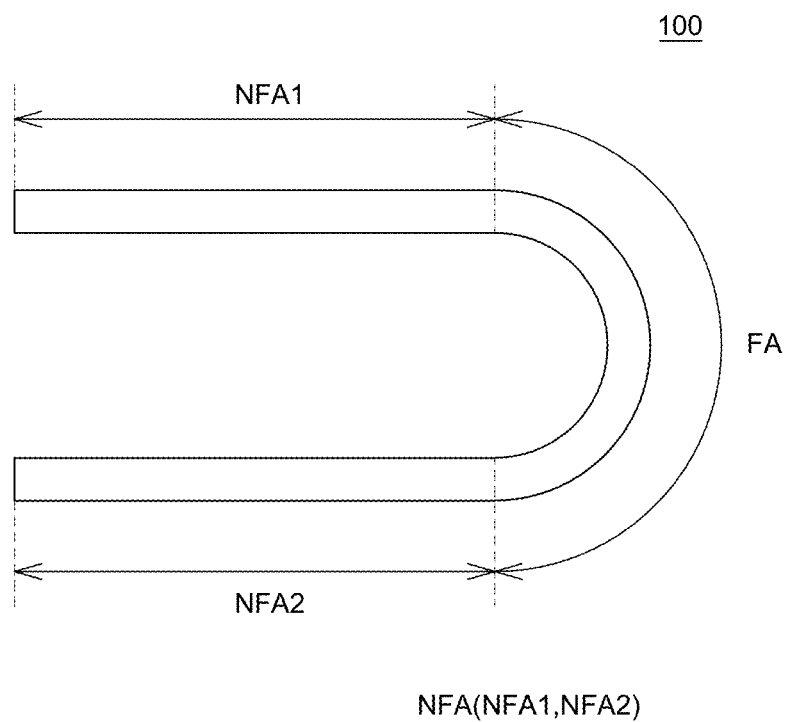
FIG. 2 is a side view schematically illustrating the display device according to exemplary embodiments of the present disclosure.

FIG. 1 is a perspective view schematically illustrating a display device according to exemplary embodiments of the present disclosure. FIG. 2 is a side view schematically illustrating the display device according to exemplary embodiments of the present disclosure.

Referring to FIG. 1 and FIG. 2, a display device 100 according to exemplary embodiments of the present disclosure may be a flexible display device. For example, the display device 100 may include a flexible substrate including flexible plastic instead of a rigid substrate including rigid glass. Therefore, the display device 100 may be freely folded or unfolded within a predetermined range. For example, the display device 100 may be a foldable display device.

Meanwhile, FIG. 1 schematically illustrates an unfolded state of the display device 100 according to exemplary embodiments of the present disclosure. Also, FIG. 2 schematically illustrates a folded state of the display device 100 according to exemplary embodiments of the present disclosure.

Referring to FIG. 1 and FIG. 2, the display device 100 according to exemplary embodiments of the present disclosure may include a display area DA and a non-display area NDA. The display area DA is provided with a plurality of pixels to display an image. The non-display area NDA is located outside the display area DA, and may be an area other than the display area DA. For example, the non-display area NDA may be provided to surround the display area DA. The non-display area NDA is an area where an image is not displayed. Also, various signal lines and driving integrated circuits (ICs) for driving pixels and driving circuits provided in the display area DA may be disposed in the non-display area NDA.

The display device 100 may be provided in various shapes. For example, the display device 100 may be provided in a rectangular plate shape having two pairs of parallel sides, and thus, the display area DA may also be provided in a rectangular plate shape, but is not limited thereto. For example, the present disclosure is not limited thereto. If the display device 100 is provided in a rectangular plate shape, a pair of sides may be longer than the other pair of sides. Meanwhile, for the convenience of description, FIG. 1 illustrates that the display device 100 has a rectangular shape having a pair of long sides and a pair of short sides. Also, FIG. 1 illustrates an extension direction of the pair of long sides as a second direction DR2 and an extension direction of the pair of short sides as a first direction DR1. In some exemplary embodiments, the display device 100 provided in a rectangular plate shape may include a round corner where a long side and a short side meet, but is not limited thereto. For example, the display device 100 may have a square shape, a polygonal shape, a circular shape, etc.

The display device 100 may display an image through a display surface, for example, the display area DA. The display area DA may be parallel to a plane defined by a first direction axis corresponding to the first direction DR1 and a second direction axis corresponding to the second direction DR2. A normal direction of the display area DA, for example, a thickness direction of the display device 100 may be defined as a third direction DR3.

A front surface (or an upper surface) and a back surface (or a lower surface) of each of members, layers or units described below may be distinguished along the third direction DR3. However, the first to third directions DR1, DR2 and DR3 are merely examples, and the first to third directions DR1, DR2 and DR3 may be interchanged as relative concepts.

According to an exemplary embodiment of the present disclosure, the display device 100 may include a folding area FA and a non-folding area NFA. The non-folding area NFA may be located on both sides of the folding area FA. For example, the non-folding area NFA may include a first non-folding area NFA1 and a second non-folding area NFA2. The folding area FA may be disposed between the first non-folding area NFA1 and the second non-folding area NFA2. For example, the first non-folding area NFA1, the folding area FA, and the second non-folding area NFA2 may be sequentially disposed along a folding direction (for example, the first direction DR1).

The folding area FA is folded when the display device 100 is folded, and may be folded in accordance with a specific radius of curvature with respect to the folding direction (for example, the first direction DR1). For example, the folding area FA may be folded along the folding direction parallel to the first direction DR1 with respect to a folding axis parallel to the second direction DR2.

For example, referring to FIG. 2, when the folding area FA is folded along the folding direction, the folding area FA may form a part of a circle or an oval. For example, a radius of curvature of the folding area FA may correspond to a radius of a circle or an oval formed by the folding area FA.

The folding area FA may include a part of the display area DA and a part of the non-display area NDA. For example, the folding area FA may include a part of the display area DA and parts of the non-display area NDA adjacent to both sides of the part of the display area DA along the second direction DR2, but is not limited thereto. For example, the folding area FA may include only a part of the display area DA.

The folding area FA may maintain substantially a flat state when the display device 100 is in the unfolded state.

The non-folding area NFA is not folded when the display device 100 is folded, and may maintain substantially a flat state. For example, referring to FIG. 1 and FIG. 2, the non-folding area NFA may maintain substantially a flat state regardless of the folded state of the display device 100 (for example, see FIG. 2) and the unfolded state (for example, see FIG. 1).

The non-folding area NFA may include a part of the display area DA and a part of the non-display area NDA. For example, the first non-folding area NFA1 may include a part of the display area DA and parts of the non-display area NDA adjacent to both sides of the part of the display area DA along the second direction DR2. Also, the second non-folding area NFA2 may include another part of the display area DA and parts of the non-display area NDA adjacent to both sides of the other part of the display area DA along the second direction DR2. However, the present disclosure is not limited thereto. For example, the non-folding area NFA may include only a part of the display area DA.

As shown in FIG. 2, when the display device 100 is folded (for example, when the folding area FA is folded along the folding direction with respect to the folding axis), the first non-folding area NFA1 may be disposed to overlap and face the second non-folding area NFA2. For example, the display device 100 may be inner-folded such that the display surface including the display area DA faces inwards. However, the present disclosure is not limited thereto. For example, the display device 100 may be outer-folded such that the display surface including the display area DA faces outwards.

Meanwhile, for the convenience of description, FIG. 1 and FIG. 2 illustrate that the display device 100 includes one folding area FA and two non-folding areas NFA1 and NFA2. However, the present disclosure is not limited thereto. For example, the display device 100 may also include three non-folding areas and two folding areas disposed between the three non-folding areas.

Figure 3A:
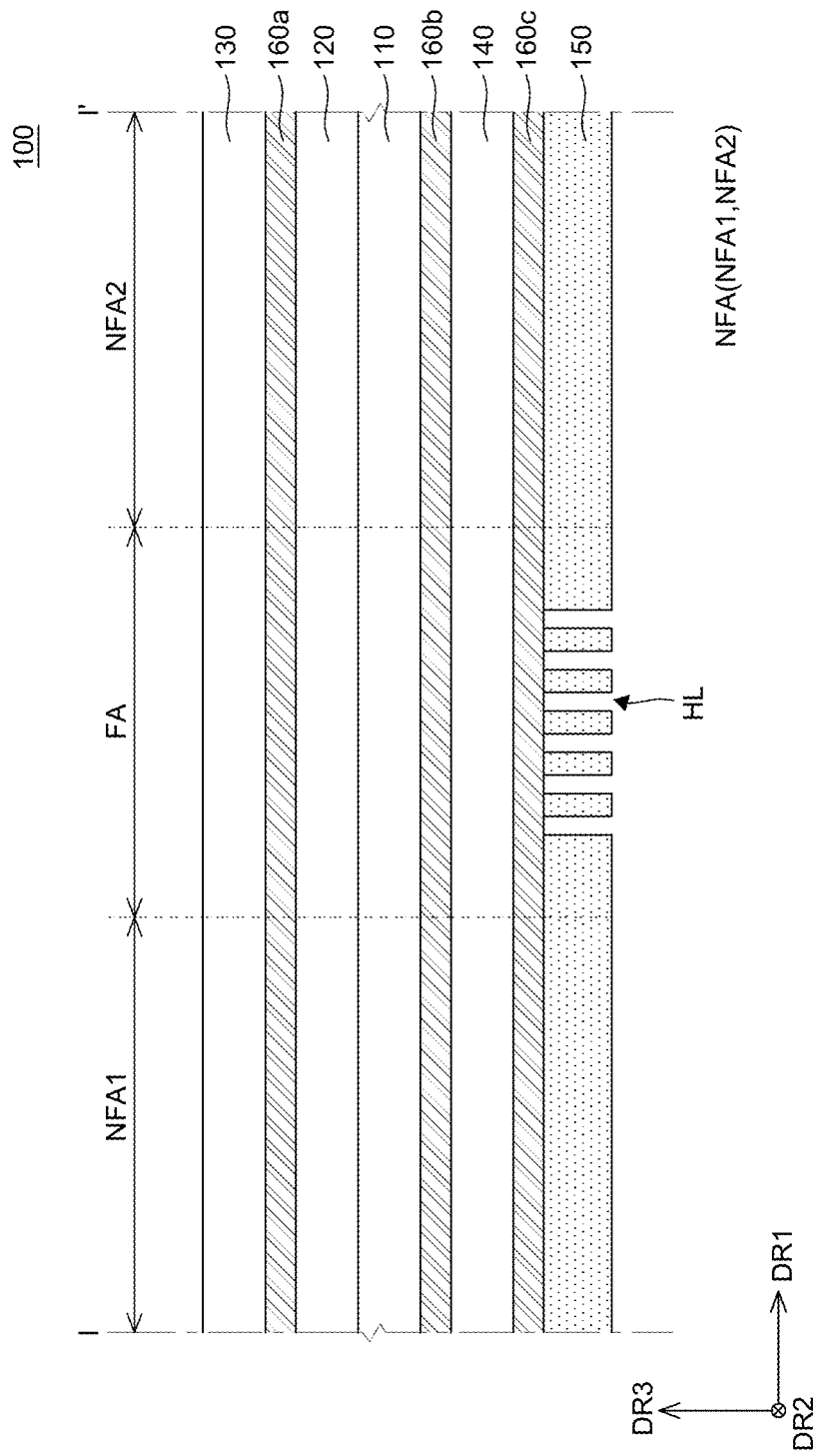
FIG. 3A is an example of a cross-sectional view as taken along a line I-I' of FIG. 1.
Figure 3B:
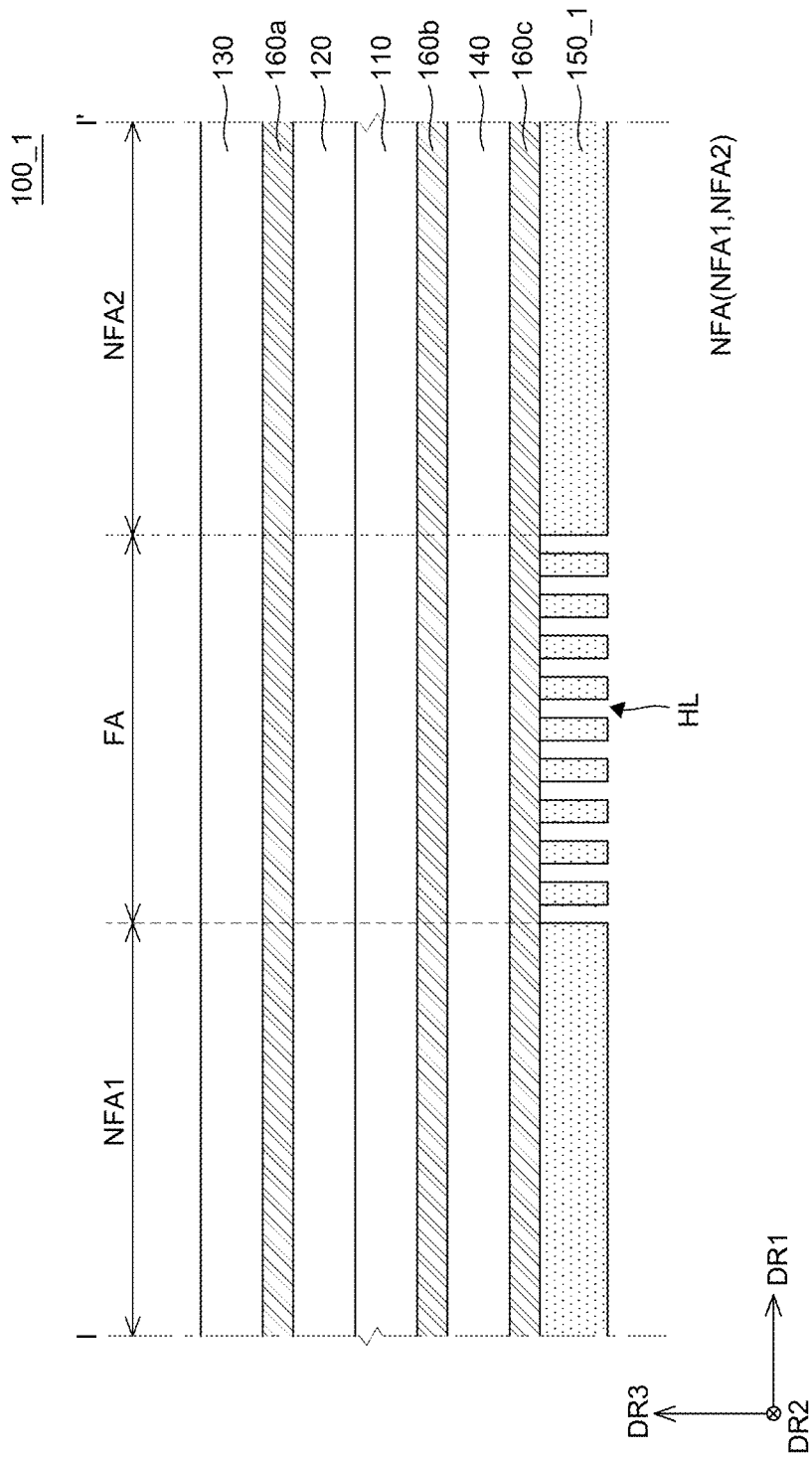
FIG. 3B is another example of a cross-sectional view as taken along the line I-I' of FIG. 1.
Figure 3C:
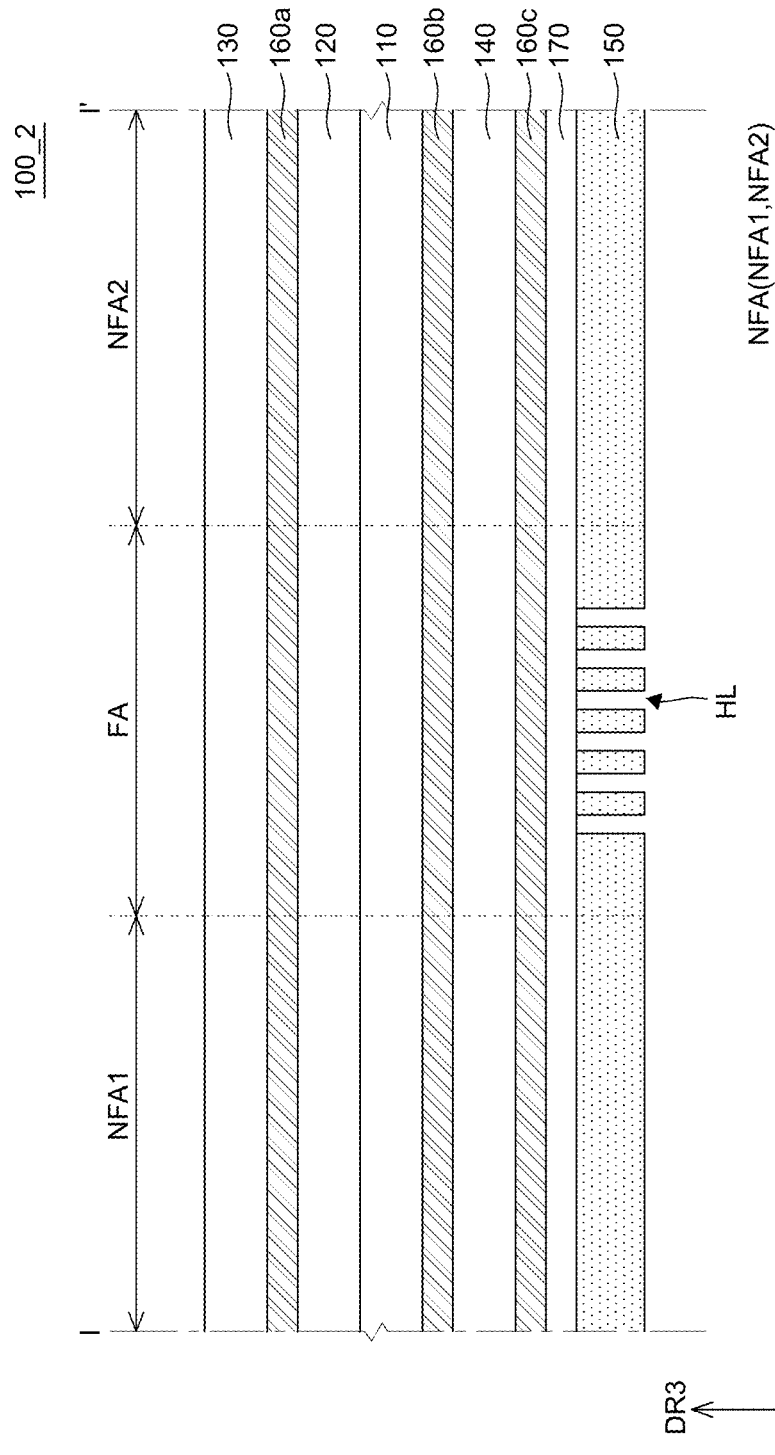
FIG. 3C is yet another example of a cross-sectional view as taken along the line I-I' of FIG. 1.

FIG. 3A is an example of a cross-sectional view as taken along a line I-I' of FIG. 1. FIG. 3B is another example of a cross-sectional view as taken along the line I-I' of FIG. 1. FIG. 3C is yet another example of a cross-sectional view as taken along the line I-I' of FIG. 1.

Referring to FIG. 1 and FIG. 3A, the display device 100 according to exemplary embodiments of the present disclosure may include a display panel 110, a polarization plate 120, a cover window 130, a top plate 140, and a bottom plate 150.

The display panel 110 may display an image. For example, the display panel 110 includes a display surface (for example, an upper surface) where an image is displayed, and an image may be displayed on the display surface.

In the display panel 110, a display element for displaying an image and a circuit unit for driving the display element may be disposed. For example, if the display device 100 is an organic light-emitting display device, the display element included in the display panel 110 may include an organic light-emitting diode, but is not limited thereto. For example, the display element may also include an inorganic light-emitting diode.

The circuit unit included in the display panel 110 may include a transistor, a capacitor, and a line for driving the display element. For example, the circuit unit may include a driving transistor, a switching transistor, a storage capacitor, a gate line, and a data line, but is not limited thereto.

The display panel 110 may be flexible in order for the display device 100 to have flexibility. For example, the display panel 110 may include a flexible substrate to implement flexibility.

For example, the substrate included in the display panel 110 may include an insulating material having flexibility. For example, the substrate included in the display panel 110 may include at least one of polyimide, polyethersulfone, polyethylene terephthalate, and polycarbonate. However, the substrate included in the display panel 110 is not limited thereto.

The polarization plate 120 may be disposed on the display panel 110. For example, the polarization plate 120 may be disposed on the upper surface (or the display surface) of the display panel 110.

The polarization plate 120 may polarize light emitted from the display panel 110 (for example, the display surface of the display panel 110) at a polarized angle. Also, the polarization plate 120 may emit the polarized light to the outside at the polarized angle. The polarization plate 120 blocks reflection of external light except the polarized light at the polarized angle and thus may reduce external light reflection of the display device 100. In some exemplary embodiments, the polarization plate 120 may be provided in the form of a film, but is not limited thereto.

The cover window 130 may be disposed on the polarization plate 120. For example, the cover window 130 may be disposed on an upper surface of the polarization plate 120.

The cover window 130 may protect the components under the cover window 130 (for example, the display panel 110, etc.) from external impacts and suppress damage, such as scratches, to the display panel 110 and the like.

The cover window 130 may include a ductile material. For example, the cover window 130 may include at least one of colorless polyimide, ultra-thin glass (UTG), polyethylene terephthalate (PET), polyimide (PI), polyethersulfone (PS), polyacrylate (PAR), polyetherimide (PEI), polyethylene naphthalate (PEN), polyphenylene sulfide (PPS), and polycarbonate (PC). However, the cover window 130 is not limited thereto.

According to an exemplary embodiment of the present disclosure, the display device 100 may further include a window protection layer disposed on the cover window 130. As described above, the cover window 130 may have ductility and thus may be vulnerable to an external force. For example, the shape of the cover window 130 may be deformed by an external force such as dent, or the cover window 130 may be eroded by repeated touches of a user. The window protection layer may suppress deformation or erosion of the cover window 130 caused by an external force. For example, the window protection layer may include a soft layer and a rigid layer laminated sequentially. In some exemplary embodiments, the window protection layer may be configured as a part of the cover window 130.

The bottom plate 150 (or support substrate) may be disposed on a back surface (or lower surface) of the display panel 110 to support the display panel 110.

The bottom plate 150 may support the display panel 110 to suppress sagging of the flexible substrate included in the display panel 110. For example, the bottom plate 150 may have a higher rigidity than the display panel 110, and thus, the bottom plate 150 may support the display panel 110. The bottom plate 150 may protect the components disposed on the flexible substrate of the display panel 110 from external moisture, heat and impacts.

The bottom plate 150 includes a plurality of holes HL. The plurality of holes HL may be formed by removing at least a part of the bottom plate 150. For example, a laser beam scans at least the part of the bottom plate 150 and then, the bottom plate 150 is wet-etched. In this case, at least the part scanned by the laser beam is removed, and thus, the holes HL may be formed. Since the plurality of holes HL is formed in the bottom plate 150, the bottom plate 150 may be easily folded in the folding area FA and may be easily restored after being folded. Therefore, the folding properties of the display device 100 may be improved.

According to an exemplary embodiment of the present disclosure, the holes HL of the bottom plate 150 may be formed corresponding to at least a part of the folding area FA. For example, as shown in FIG. 3A, the holes HL of the bottom plate 150 may be formed corresponding to a partial area of the folding area FA. For example, the holes HL of the bottom plate 150 may be formed corresponding to a partial area of the folding area FA adjacent to the folding axis with respect to the folding axis of the display device 100. However, the present disclosure is not limited thereto.

For example, referring to FIG. 3B, the holes HL of a bottom plate 150_1 included in a display device 100_1 may also be formed corresponding to the entire folding area FA.

Referring to FIG. 3A, the bottom plate 150 according to an exemplary embodiment of the present disclosure may include a first area including a metal material and a second area including a plastic material. For example, the bottom plate 150 may include the first area disposed corresponding to the folding area FA and the second area disposed corresponding to the non-folding area NFA.

According to an exemplary embodiment of the present disclosure, the first area of the bottom plate 150 disposed corresponding to the folding area FA may include a metal material. This is to secure foldability of the display device 100 and form the holes HL by removing at least a part of the bottom plate 150 corresponding to the folding area FA. If the first area of the bottom plate 150 includes a metal material, foldability of the display device 100 may be secured by means of high restoring force and rigidity.

The second area of the bottom plate 150 disposed corresponding to the non-folding area NFA where the holes HL are not formed may include a plastic material. If second area of the bottom plate 150 includes a plastic material, a total weight of the bottom plate 150 (or display device 100) may be reduced (for example, minimized) compared to a case where the entire bottom plate 150 is made of a metal material.

As described above, since the bottom plate 150 includes the first area including a metal material and the second area including a plastic material, foldability of the display device 100 may be secured. Also, the total weight of the display device 100 may be reduced (for example, minimized). A detailed configuration of the bottom plate 150 will be described with reference to FIG. 4 through FIG. 15.

Referring to FIG. 3A, the top plate 140 (or back plate) may be disposed between the display panel 110 and the bottom plate 150 to support the display panel 110 together with the bottom plate 150.

When the display device 100 is folded, the top plate 140 may maintain a curvature of the display panel 110 and suppress the occurrence of creases on the upper surface of the display panel 110. The top plate 140 is disposed between the display panel 110 and the bottom plate 150. Thus, it is possible to suppress a transfer or distortion of the display screen caused by the plurality of holes HL formed corresponding to the folding area FA of the bottom plate 150.

In some exemplary embodiments, the display device 100 may further include at least one adhesive layer 160a, 160b and 160c each disposed between the members, layers or units. For example, the display device 100 may include a first adhesive layer 160a between the polarization plate 120 and the cover window 130 and a second adhesive layer 160b between the display panel 110 and the top plate 140. Also, the display device 100 may include a third adhesive layer 160c between the top plate 140 and the bottom plate 150. Since each of the adhesive layers 160a, 160b and 160c is disposed between the members, layers or units of the display device 100 as described above, the members, layers or units may be bonded to each other.

For example, each of the adhesive layers 160a, 160b and 160c may include an optical clear adhesive (OCA), a pressure sensitive adhesive (PSA), a photocurable resin or a thermosetting resin. However, the present disclosure is not limited thereto.

For example, the display device 100 may further include an adhesive layer in addition to the adhesive layers 160a, 160b and 160c, or at least one of the adhesive layers 160a, 160b and 160c may be omitted.

Referring to FIG. 3C, a display device 100_2 according to an exemplary embodiment of the present disclosure may further include a coating layer 170 disposed between the top plate 140 and the bottom plate 150. The coating layer 170 is disposed on the bottom plate 150 to reduce a stress caused by folding of the bottom plate 150. For example, the coating layer 170 may include at least one of silicon, silicone, silicone foam, polyurethane, and polyurethane foam. The material included in the coating layer 170 is not limited thereto.

Figure 4:
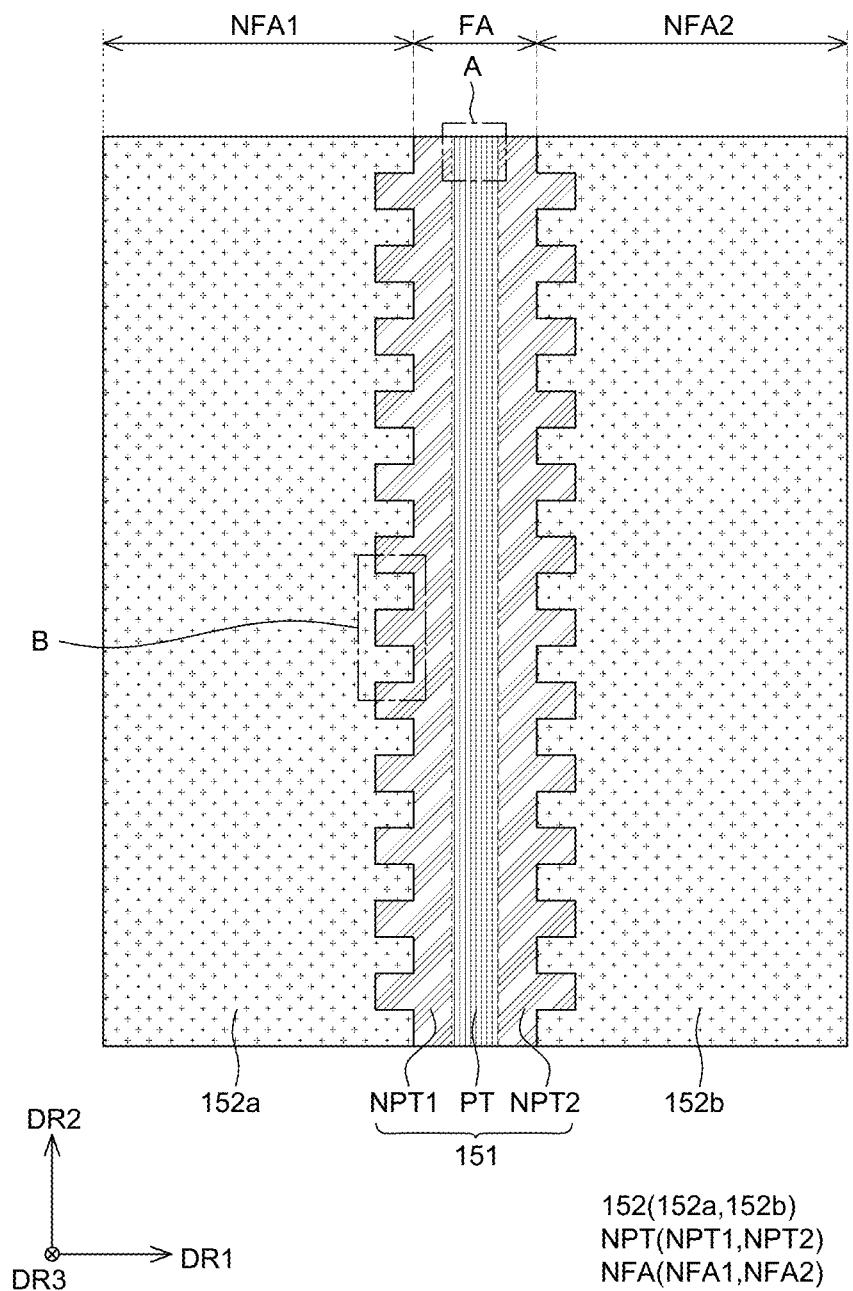
FIG. 4 is a plan view showing an example of a bottom plate included in the display device of FIG. 1.

FIG. 4 is a plan view showing an example of a bottom plate included in the display device of FIG. 1. FIG. 5A through FIG. 5D are enlarged views showing examples of a portion A of FIG. 4. FIG. 6 is an enlarged view showing an example of a portion B of FIG. 4.

Referring to FIG. 1, FIG. 3A, and FIG. 4, the bottom plate 150 may include a first area 151 and second area 152.

The first area 151 may be disposed corresponding to the folding area FA. For example, the first area 151 may be disposed to overlap the folding area FA. A part of the first area 151 may be disposed corresponding to the non-folding area NFA. For example, at least a part of the first area 151 may protrude toward each of the first non-folding area NFA1 and the second non-folding area NFA2 along a direction parallel to the first direction DR1 to form a protrusion.

According to an exemplary embodiment of the present disclosure, the first area 151 may include a metal material. For example, the first area 151 of the bottom plate 150 may include a metal material such as stainless steel (SUS), nobinite, invar, nickel (Ni), iron (Fe), etc.

The first area 151 may include a pattern part PT and a non-pattern part NPT. For example, the non-pattern part NPT includes a first non-pattern part NPT1 and a second non-pattern part NPT2. Also, the pattern part PT may be disposed between the first non-pattern part NPT1 and the second non-pattern part NPT2.

The pattern part PT may be disposed to overlap at least a part of the folding area FA. For example, the pattern part PT may be disposed to correspond to an intermediate area of the folding area FA with respect to the folding axis of the display device 100.

According to an exemplary embodiment of the present disclosure, the pattern part PT may include the plurality of holes described above with reference to FIG. 1 through FIG. 3C.

Figure 5A:
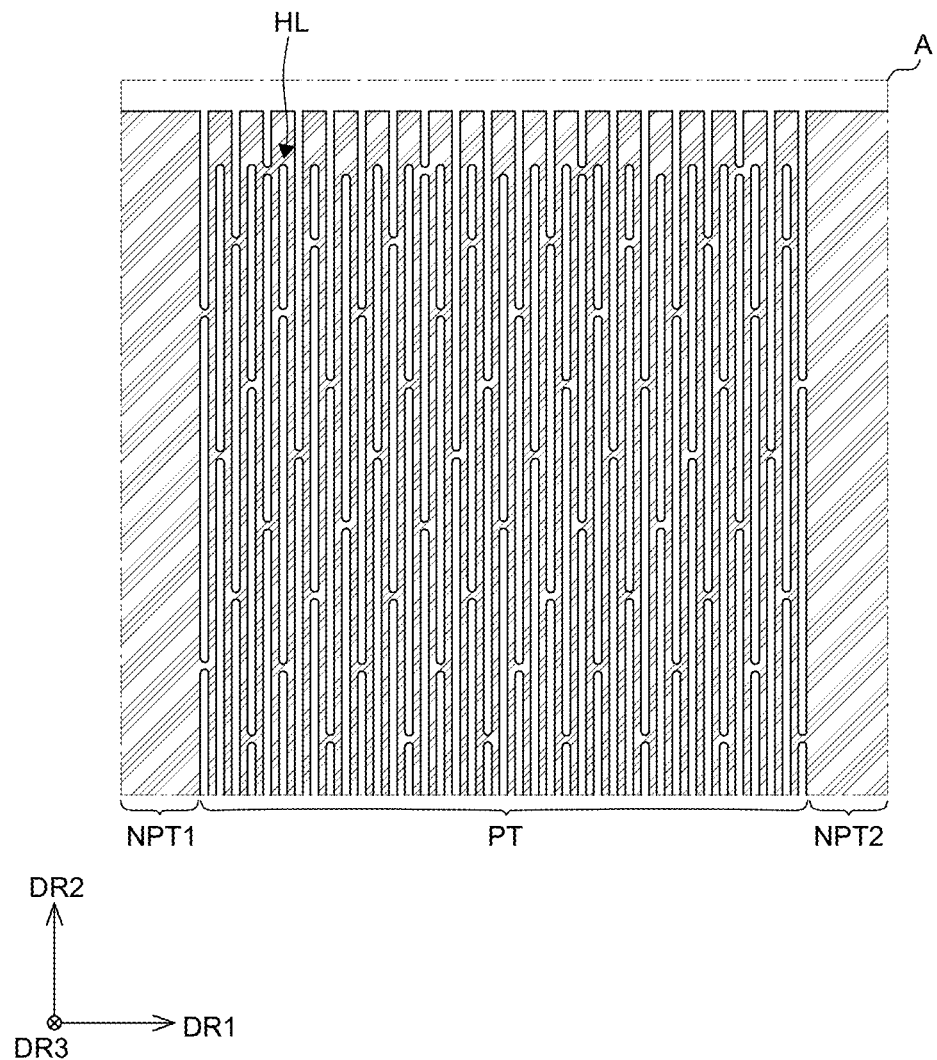
FIG. 5A through FIG. 5D are enlarged views showing examples of a portion A of FIG. 4.
Figure 6:
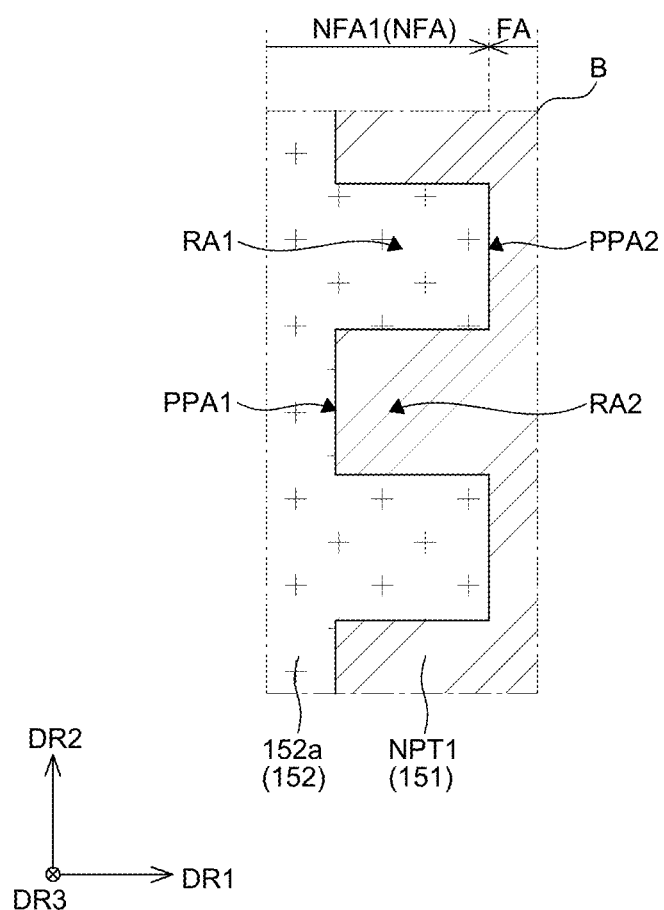
FIG. 6 is an enlarged view showing an example of a portion B of FIG. 4.

Referring to FIG. 5A, the plurality of holes HL may be formed in the pattern part PT and spaced apart from each other. For example, the plurality of holes HL may be formed by removing at least a part of the pattern part PT included in the first area 151 of the bottom plate 150.

According to an exemplary embodiment of the present disclosure, the plurality of holes HL may have substantially the same or similar shape. For example, as shown in FIG. 5A, each of the plurality of holes HL may have an oval shape. For example, each of the plurality of holes HL may have an oval shape of which the major axis is parallel to the second direction DR2 and the minor axis is parallel to the first direction DR1. For example, each of the plurality of holes HL may have an oval shape extending along the second direction DR2.

Each of the plurality of holes HL may have a specific length (or major axis length), and the plurality of holes HL may be spaced apart from each other at a specific interval on the same line (or on the same column). Some of the plurality of holes HL disposed on the same line (or on the same column) may be disposed to be offset from some of the plurality of holes HL disposed on the adjacent line (or on the adjacent column). However, the present disclosure is not limited thereto. For example, some of the plurality of holes HL disposed on the same line (or on the same column) may be disposed to be parallel to some of the plurality of holes HL disposed on the adjacent line (or on the adjacent column). The shape and arrangement of the plurality of holes HL are not limited thereto.

Figure 5B:
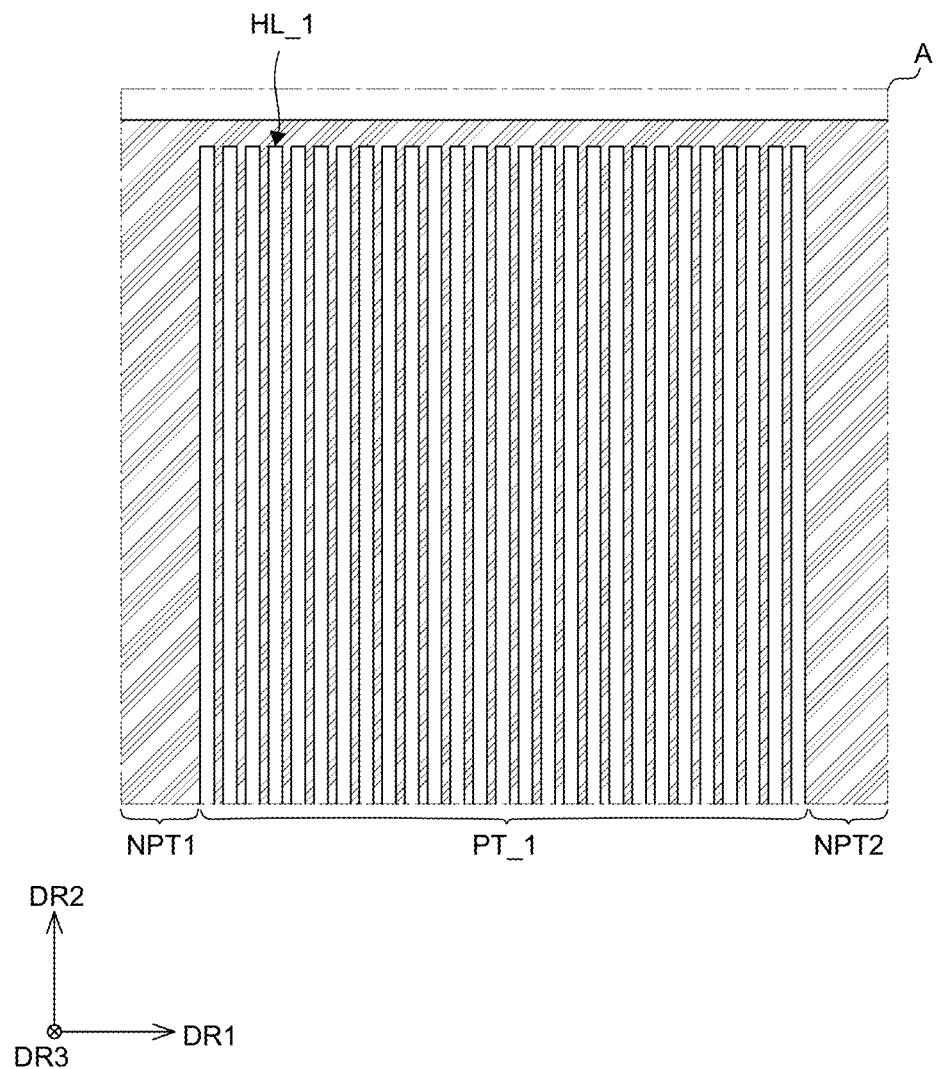

For example, referring to FIG. 5B, each of a plurality of holes HL_1 included in a pattern part PT_1 may have a rectangular shape. For example, each of the plurality of holes HL_1 may have a retinular shape of which the long side is parallel to the second direction DR2 and the short side is parallel to the first direction DR1. For example, each of the plurality of holes HL_1 may have a rectangular shape extending along the second direction DR2.

The plurality of holes HL_1 may have the same shape and the same size. The holes HL_1 may be formed in the pattern part PT_1 such that only one hole HL_1 extending along the second direction DR2 is disposed on the same line (or on the same column).

Figure 5C:
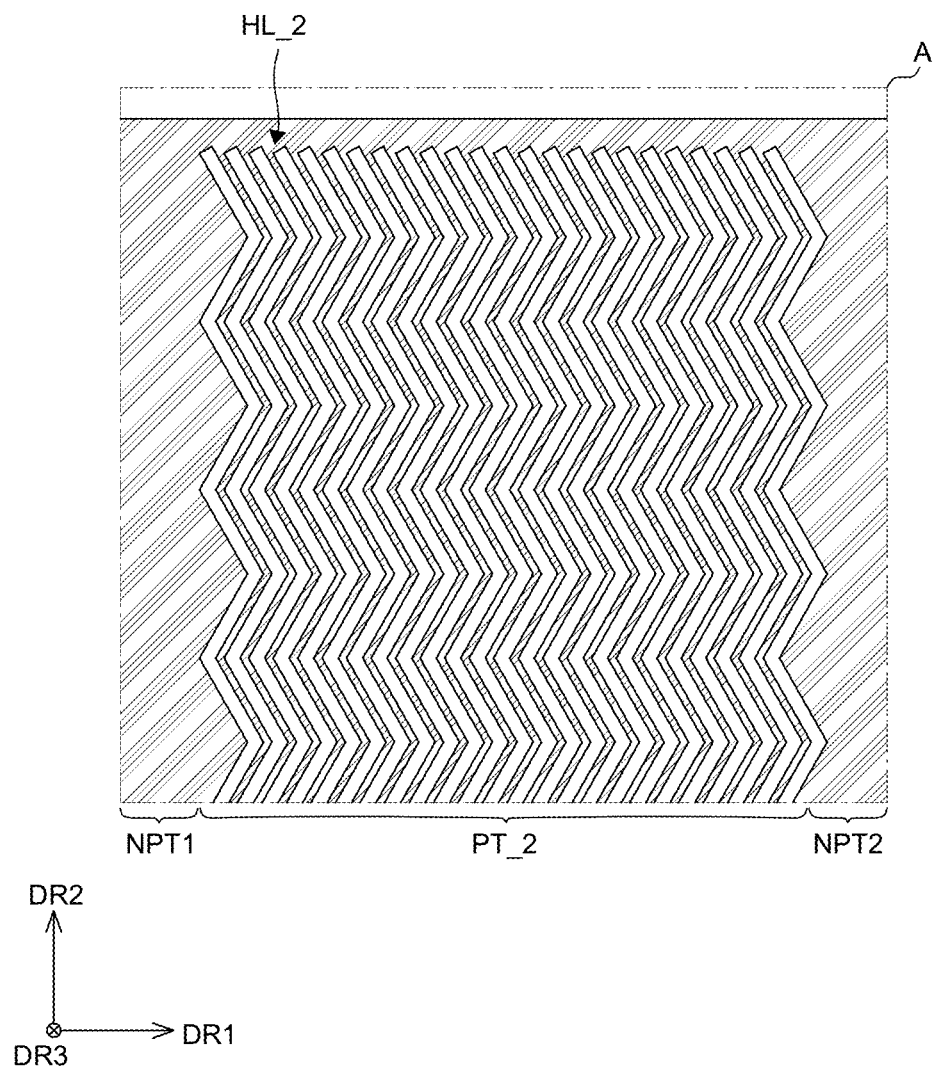

For example, referring to FIG. 5C, each of a plurality of holes HL_2 included in a pattern part PT_2 may have a wave shape. For example, each of the plurality of holes HL_2 may have an overall wave shape extending along the second direction DR2.

The plurality of holes HL_2 may have the same shape and the same size. The holes HL_2 may be formed in the pattern part PT_2 such that only one hole HL_2 extending along the second direction DR2 is disposed on the same line (for example, on the same column).

Figure 5D:
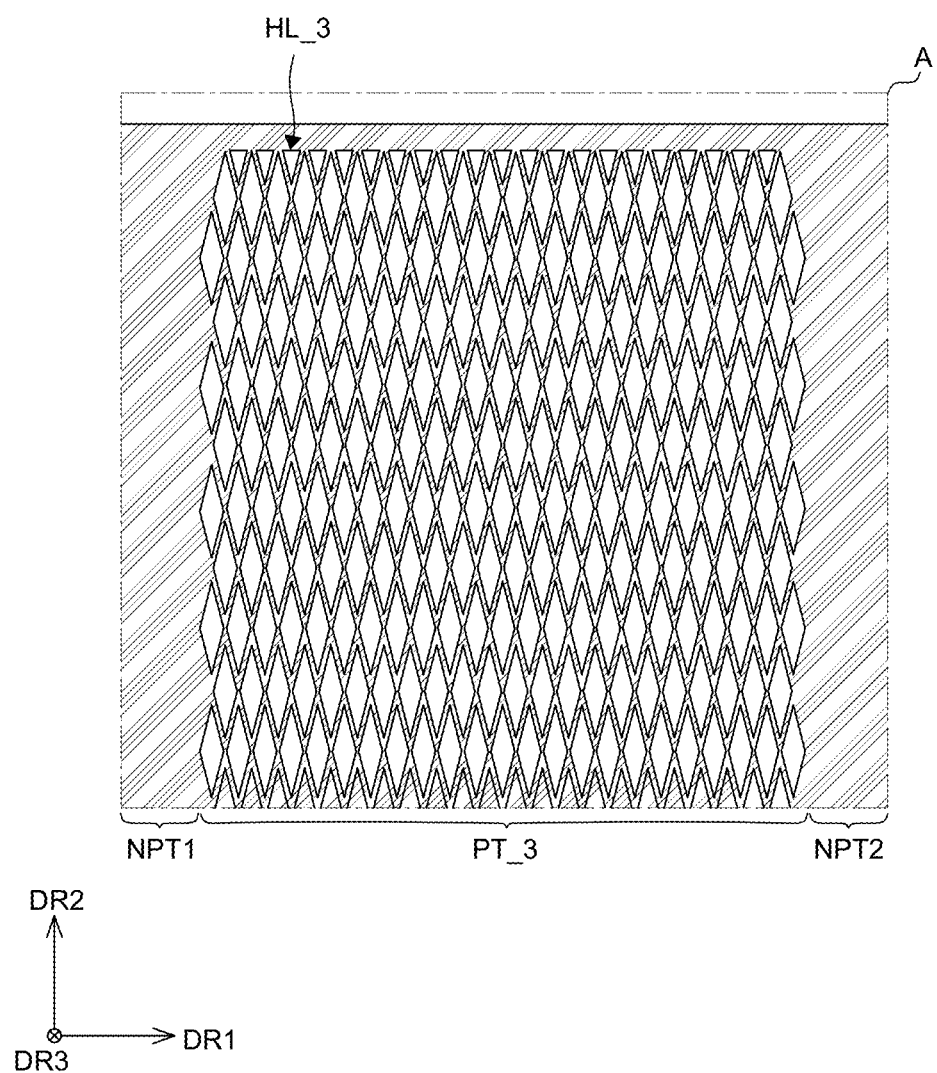

For example, referring to FIG. 5D, each of a plurality of holes HL_3 included in a pattern part PT_3 may have a rhombic shape. For example, each of the plurality of holes HL_3 may have a rhombic shape of which the major axis is parallel to the second direction DR2 and the minor axis is parallel to the first direction DR1.

Each of the plurality of holes HL_3 may have a specific length (or major axis length), and the plurality of holes HL_3 may be spaced apart from each other at a specific interval on the same line (or on the same column). Some of the plurality of holes HL_3 disposed on the same line (or on the same column) may be disposed to be offset from some of the plurality of holes HL_3 disposed on the adjacent line (or on the adjacent column). However, the present disclosure is not limited thereto. For example, some of the plurality of holes HL_3 disposed on the same line (or on the same column) may be disposed to be parallel to some of the plurality of holes HL_3 disposed on the adjacent line (or on the adjacent column).

The shapes and arrangements of the holes HL, HL_1, HL_2 and HL_3 described above with reference to FIG. 5A through FIG. 5D are merely examples. The shapes and arrangements of the holes HL, HL_1, HL_2 and HL_3 may be modified in various ways.

Referring to FIG. 4, the non-pattern part NPT may be disposed in the folding area FA so as not to overlap the pattern part PT. For example, the non-pattern part NPT may include the first non-pattern part NPT1 and the second non-pattern part NPT2, and the first non-pattern part NPT1 and the second non-pattern part NPT2 may be disposed on the respective sides of the pattern part PT. For example, the pattern part PT may be disposed between the first non-pattern part NPT1 and the second non-pattern part NPT2. For example, the first non-pattern part NPT1 may be disposed on one side of the pattern part PT on the first non-folding area NFA1's side. Also, the second non-pattern part NPT2 may be disposed on the other side of the pattern part PT on the second non-folding area NFA2's side.

A part of the non-pattern part NPT (or a part of the non-pattern part NPT excluding a protrusion to be described below) may be disposed to overlap the entire folding area FA excluding an area where the pattern part PT is disposed. For example, the part of the non-pattern part NPT and the area where the pattern part PT is disposed may correspond to the entire folding area FA.

The second area 152 may be disposed corresponding to the non-folding area NFA. For example, the second area 152 may be disposed to overlap the non-folding area NFA. For example, the second area 152 may include a first sub-area 152a and a second sub-area 152b. Also, the first sub-area 152a may be disposed to overlap the first non-folding area NFA1, and the second sub-area 152b may be disposed to overlap the second non-folding area NFA2.

According to an exemplary embodiment of the present disclosure, the second area 152 may include a plastic material. For example, the second area 152 of the bottom plate 150 may include a polymer material such as polymethylmetacrylate (PMMA), polycarbonate (PC), polyvinylalcohol (PVA), acrylonitrile-butadiene-styrene (ABS), polyethylene terephthalate (PET), silicone, and polyurethane (PU).

According to an exemplary embodiment of the present disclosure, the non-pattern part NPT may include a protrusion protruding toward the non-folding area NFA. For example, the first non-pattern part NPT1 may include at least one protrusion protruding toward the first non-folding area NFA1 in a direction opposite to the first direction DR1. Also, the second non-pattern part NPT2 may include at least one protrusion protruding toward the second non-folding area NFA2 in the first direction DR1.

Referring to FIG. 6, the first non-pattern part NPT1 includes first protrusions PPA1 protruding in the direction opposite to the first direction DR1. For example, each of the first protrusions PPA1 may be formed to protrude from a boundary between the folding area FA and the first non-folding area NFA1 toward the first non-folding area NFA1 in the direction opposite to the first direction DR1. For example, each of the first protrusions PPA1 may overlap the first non-folding area NFA1.

Each of the first protrusions PPA1 may have a rectangular shape. However, the present disclosure is not limited thereto.

First recesses RA1 of the first non-pattern part NPT1 may be defined in a part of the first non-folding area NFA1 where the first protrusions PPA1 are not formed. For example, each of the first recesses RA1 may be disposed between the first protrusions PPA1 adjacent to each other.

According to an exemplary embodiment of the present disclosure, the first sub-area 152a may include second protrusions PPA2 protruding toward the folding area FA in the first direction DR1. For example, each of the second protrusions PPA2 may be formed to protrude toward the folding area FA in the first direction DR1. The second protrusions PPA2 may be formed respectively corresponding to the first recesses RA1 of the first non-pattern part NPT1. For example, each of the second protrusions PPA2 may overlap the first non-folding area NFA1.

Each of the second protrusions PPA2 may have a rectangular shape. However, the present disclosure is not limited thereto.

The second protrusions PPA2 are disposed respectively corresponding to the first recesses RA1. Therefore, each of the first recesses RA1 may have a rectangular shape corresponding to the shape of each of the second protrusions PPA2.

Second recesses RA2 of the first sub-area 152a may be defined in a part of the first non-folding area NFA1 where the second protrusions PPA2 are not formed. For example, each of the second recesses RA2 may be disposed between the second protrusions PPA2 adjacent to each other.

The first protrusions PPA1 are disposed respectively corresponding to the second recesses RA2. Therefore, each of the second recesses RA2 may have a rectangular shape corresponding to the shape of each of the first protrusions PPA1.

FIG. 6 illustrates that the first protrusions PPA1 have the same width and are disposed at the same interval, and the second protrusions PPA2 have the same width and are disposed at the same interval. However, the present disclosure is not limited thereto. For example, the first protrusions PPA1 and the second protrusions PPA2 may have different widths or may be disposed at different intervals.

The first protrusions PPA1 and the second protrusions PPA2 have been described as separate components for the convenience of description. For example, according to an exemplary embodiment of the present disclosure, the first protrusions PPA1 may be a part of the first non-pattern part NPT1 (or the first area 151). That is, the first non-pattern part NPT1 (or the first area 151) may be integrally formed with the first protrusions PPA1. For example, the second protrusions PPA2 may be a part of the first sub-area 152a (or the second area 152). That is, the first sub-area 152a (or the second area 152) may be integrally formed with the second protrusions PPA2.

Referring to FIG. 6, the first protrusions PPA1 of the first non-pattern part NPT1 and the second protrusions PPA2 of the first sub-area 152a have been described as an example. Protrusions may also be formed in the second non-pattern part NPT2 and the second sub-area 152b so as to correspond to a boundary between the folding area FA and the second non-folding area NFA2 in substantially the same or similar manner.

As described above with reference to FIG. 6, the non-pattern part NPT (or the first non-pattern part NPT1, or the second non-pattern part NPT2) of the first area 151 includes a plurality of first protrusions PPA1. Also, the second area 152 (or the first sub-area 152a, or the second sub-area 152b) includes a plurality of second protrusions PPA2. Thus, the first protrusions PPA1 may be in contact with the second recesses RA2 of the second area 152 (or the first sub-area 152a, or the second sub-area 152b). Also, the second protrusions PPA2 may be in contact with the first recesses RA1 of the non-pattern part NPT (or the first non-pattern part NPT1, or the second non-pattern part NPT2) of the first area 151. For example, as the first protrusions PPA1 are engaged with the second protrusions PPA2, the non-pattern part NPT (or the first non-pattern part NPT1, or the second non-pattern part NPT2) of the first area 151 may be connected to the second area 152 (or the first sub-area 152a, or the second sub-area 152b). Due to the connection between the first protrusions PPA1 and the second recesses RA2 and/or the connection between the second protrusions PPA2 and the first recesses RA1, a contact area between the first area 151 (or the non-pattern part NPT of the first area 151) and the second area 152 of the bottom plate 150 including different materials from each other increases. Therefore, a contact strength (or connecting force) between the first area 151 and the second area 152 may be enhanced. Accordingly, it is possible to suppress (or eliminate) deformation of the display device 100 (for example, the bottom plate 150) caused by a stress during folding or unfolding of the display device 100. This will be described in more detail with reference to FIG. 7A through FIG. 8B.

The bottom plate 150 may be formed by a double injection molding process. For example, the first area 151 and the second area 152 of the bottom plate 150 may be formed by the double injection molding process. Therefore, the first area 151 and the second area 152 including different materials from each other may form the integrated bottom plate 150 through a single process. Also, the first area 151 and the second area 152 may be formed without any adhesive.

Figure 7A:
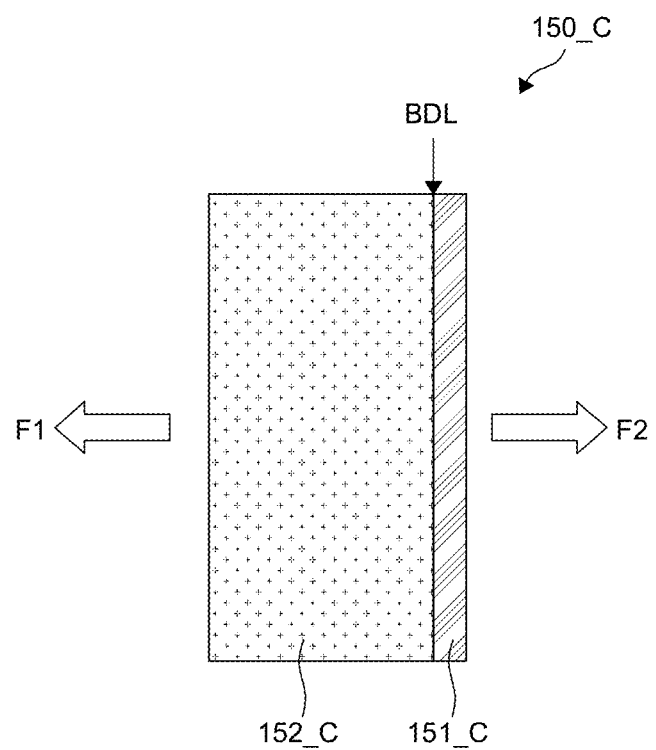
FIG. 7A and FIG. 7B are diagrams for explaining a connecting force of a bottom plate according to a comparative example of the present disclosure.
Figure 7B:
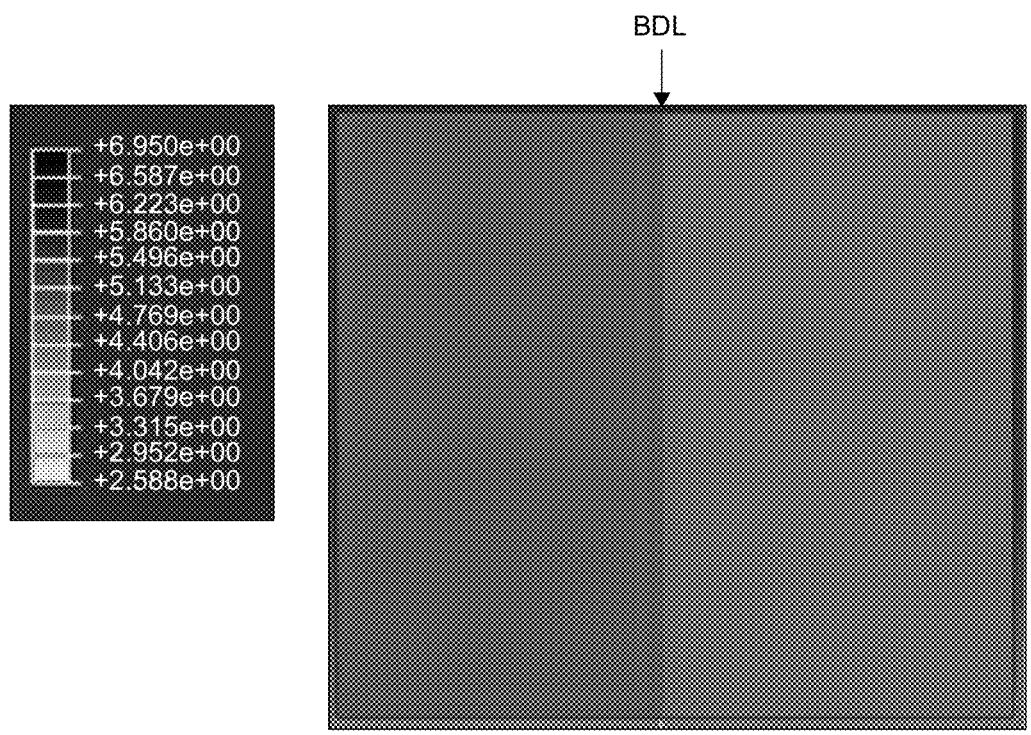
Figure 8A:
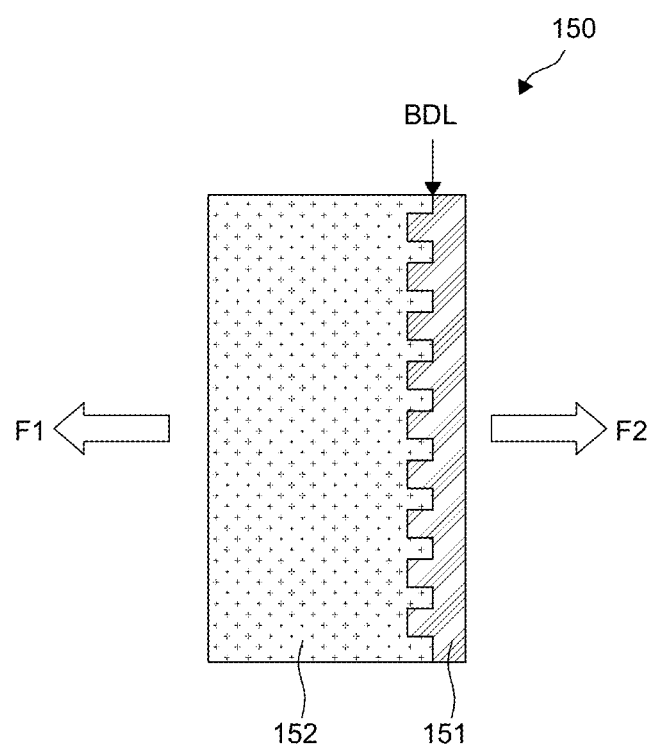
FIG. 8A and FIG. 8B are diagrams for explaining a connecting force of a bottom plate according to an exemplary embodiment of the present disclosure.
Figure 8B:
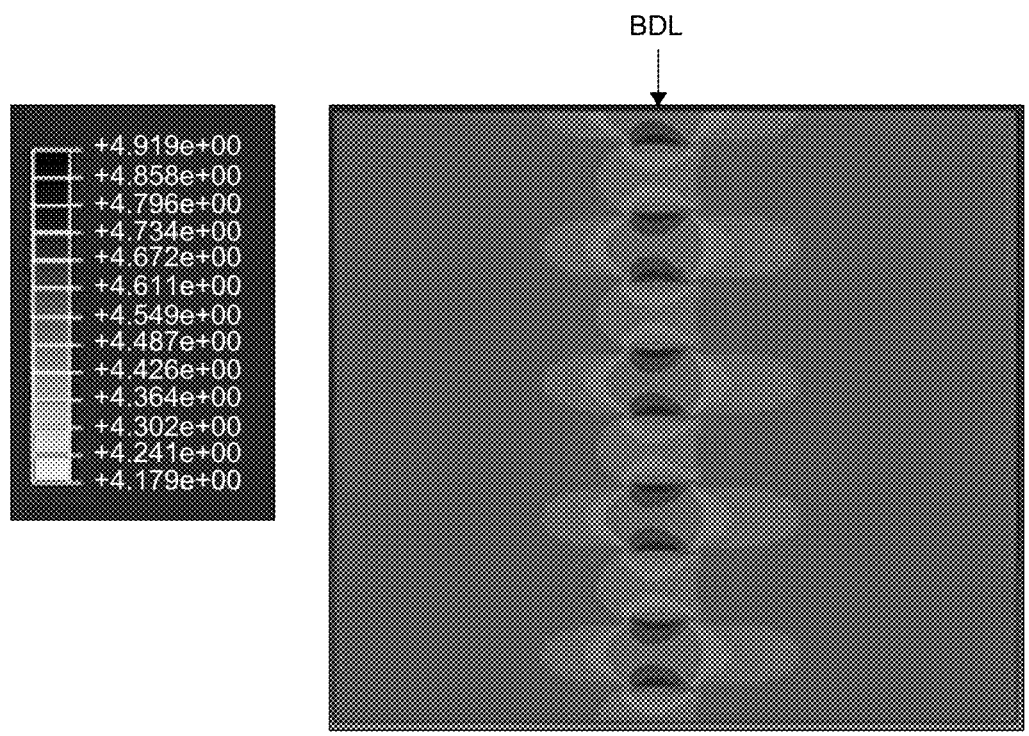

FIG. 7A and FIG. 7B are diagrams for explaining a connecting force of a bottom plate according to a comparative example of the present disclosure. FIG. 8A and FIG. 8B are diagrams for explaining a connecting force of a bottom plate according to an exemplary embodiment of the present disclosure.

Referring to FIG. 7A and FIG. 7B, a bottom plate 150_C according to an exemplary embodiment of the present disclosure may include a first area 151_C and a second area 152_C. When a tensile stress is applied to the bottom plate 150_C as the display device is folded and unfolded, a connecting force at a boundary BDL between the first area 151_C and the second area 152_C may decrease.

For example, forces F1 and F2 of 5 MPa may be applied to both sides of the bottom plate 150_C including the first area 151_C having a modulus of 70 Gpa and the second area 152_C having a modulus of 192. Gpa (for example, the bottom plate 150_C may be pulled with the forces F1 and F2 of 5 MPa). In this case, a relatively high tensile stress may be concentrated on the boundary BDL between the first area 151_C and the second area 152_C of the bottom plate 150_C. For example, as shown in FIG. 7B, a tensile stress of up to 6.95 Mpa may be concentrated on the boundary BDL between the first area 151_C and the second area 152_C of the bottom plate 150_C. Therefore, the connecting force between the first area 151_C and the second area 152_C may decrease.

Referring to FIG. 8A and FIG. 8B, the bottom plate 150 according to an exemplary embodiment of the present disclosure may include the first area 151 and the second area 152. Herein, even when a tensile stress is applied to the bottom plate 150 as the display device 100 is folded and unfolded, the first area 151 and the second area 152 are firmly connected to each other through the protrusions. Therefore, the first area 151 and the second area 152 may stably maintain the connection therebetween.

For example, the forces F1 and F2 of 5 MPa may be applied to both sides of the bottom plate 150 including the first area 151 having a modulus of 70. Gpa and the second area 152 having a modulus of 192. Gpa (for example, the bottom plate 150 may be pulled with the forces F1 and F2 of 5 MPa). In this case, a contact area increases due to the protrusions included in the first area 151 and the second area 152. Therefore, a tensile stress is not concentrated on the boundary BDL between the first area 151 and the second area 152 of the bottom plate 150, but may be dispersed. The connecting force between the first area 151 and the second area 152 is enhanced due to the protrusions included in the first area 151 and the second area 152. Therefore, a relatively low tensile stress of up to 4.92. Mpa may be applied to the boundary BDL between the first area 151 and the second area 152 of the bottom plate 150. Therefore, the connecting force between the first area 151 and the second area 152 may be maintained high.

Figure 9:
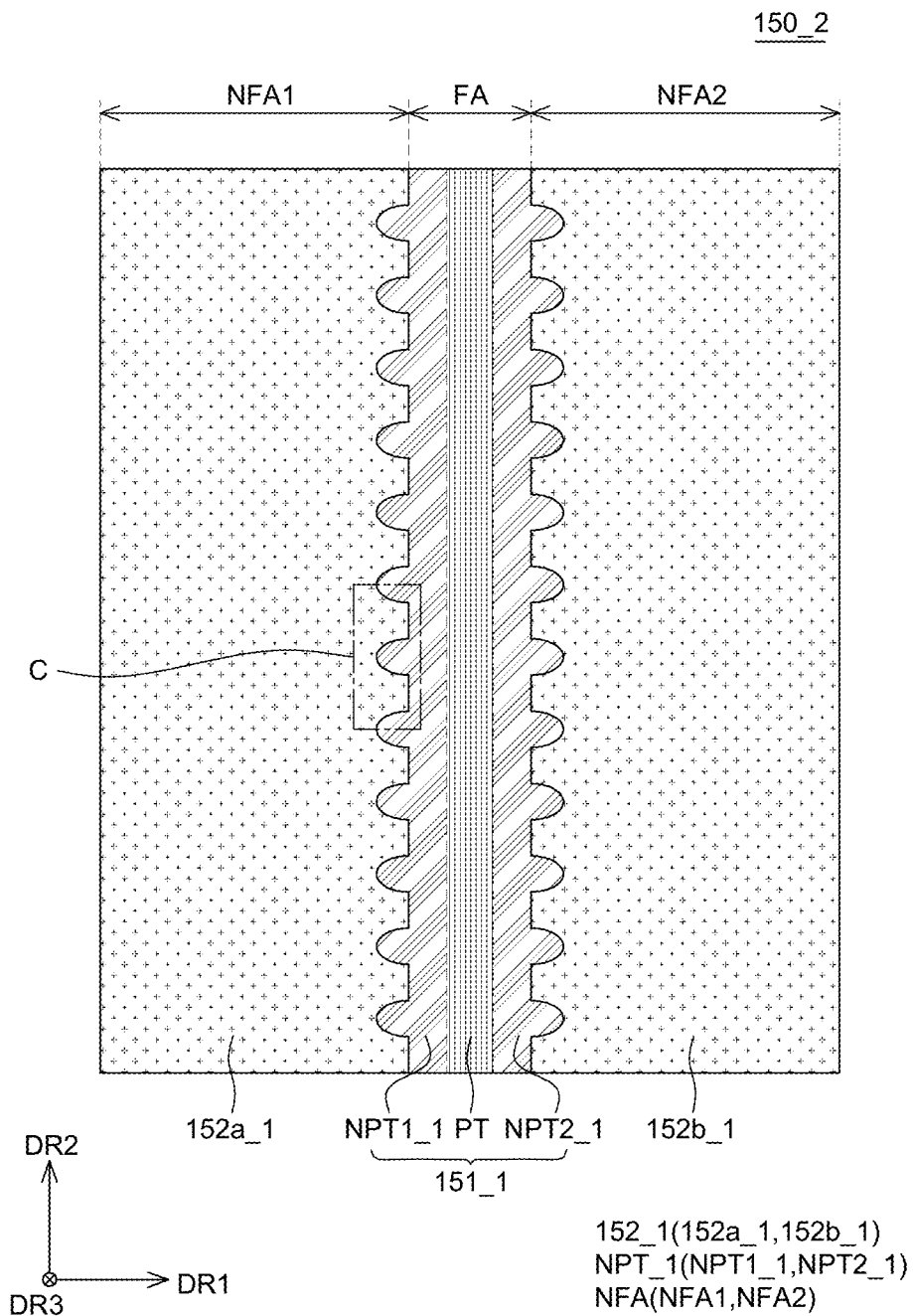
FIG. 9 is a plan view showing another example of the bottom plate included in the display device of FIG. 1.
Figure 10:
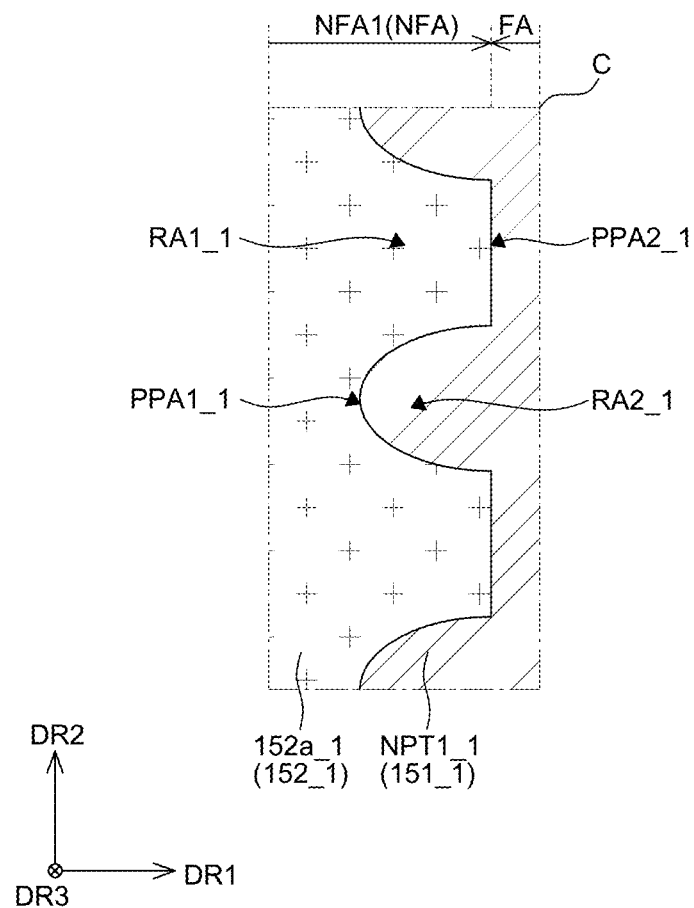
FIG. 10 is an enlarged view showing an example of a portion C of FIG. 9.

FIG. 9 is a plan view showing another example of the bottom plate included in the display device of FIG. 1. FIG. 10 is an enlarged view showing an example of a portion C of FIG. 9.

The components illustrated in FIG. 9 and FIG. 10 are substantially the same as those in FIG. 4 and FIG. 6. Therefore, the description thereof will be omitted or briefly provided.

Referring to FIG. 9 and FIG. 10, a bottom plate 150_2 may include a first area 151_1 and a second area 152_1.

The first area 151_1 may include the pattern part PT and a non-pattern part NPT_1 (for example, a first non-pattern part NPT1_1 and a second non-pattern part NPT2_1) disposed on both sides of the pattern part PT. Also, the second area 152_1 may include a first sub-area 152a_1 and a second sub-area 152b_1 disposed in the first non-folding area NFA1 and the second non-folding area NFA2, respectively.

According to an exemplary embodiment of the present disclosure, the non-pattern part NPT_1 (for example, the first non-pattern part NPT1_1 or the second non-pattern part NPT2_1) may include first protrusions PPA1_1. The first protrusions PPA1_1 protrude from a boundary between the folding area FA and the non-folding area NFA (for example, the first non-folding area NFA1 or the second non-folding area NFA2) toward the non-folding area NFA in the first direction DR1 (or in the direction opposite to the first direction DR1).

According to an exemplary embodiment of the present disclosure, each of the first protrusions PPA1_1 have a semi-circular shape or a semi-oval shape.

First recesses RA1_1 may be defined in a part of the non-folding area NFA (for example, the first non-folding area NFA1 or the second non-folding area NFA2) where the first protrusions PPA1_1 are not formed. For example, each of the first recesses RA1_1 may be disposed between the first protrusions PPA1_1 adjacent to each other.

According to an exemplary embodiment of the present disclosure, the second area 152_1 (for example, the first sub-area 152a_1 or the second sub-area 152b_1) may include second protrusions PPA2_1 protruding toward the folding area FA in the direction opposite to the first direction DR1 (or in the first direction DR1). The second protrusions PPA2_1 may be formed respectively corresponding to the first recesses RA1_1. Therefore, each of the second protrusions PPA2_1 may correspond in shape to each of the first recesses RA1_1.

Second recesses RA2_1 may be defined in a part of the non-folding area NFA (for example, the first non-folding area NFA1 or the second non-folding area NFA2) where the second protrusions PPA2_1 are not formed. For example, each of the second recesses RA2_1 may be disposed between the second protrusions PPA2_1 adjacent to each other.

The first protrusions PPA1_1 are disposed respectively corresponding to the second recesses RA2_1. Therefore, each of the second recesses RA2_1 may have a semi-circular shape or a semi-oval shape corresponding to the shape of each of the first protrusions PPA1_1.

Figure 11:
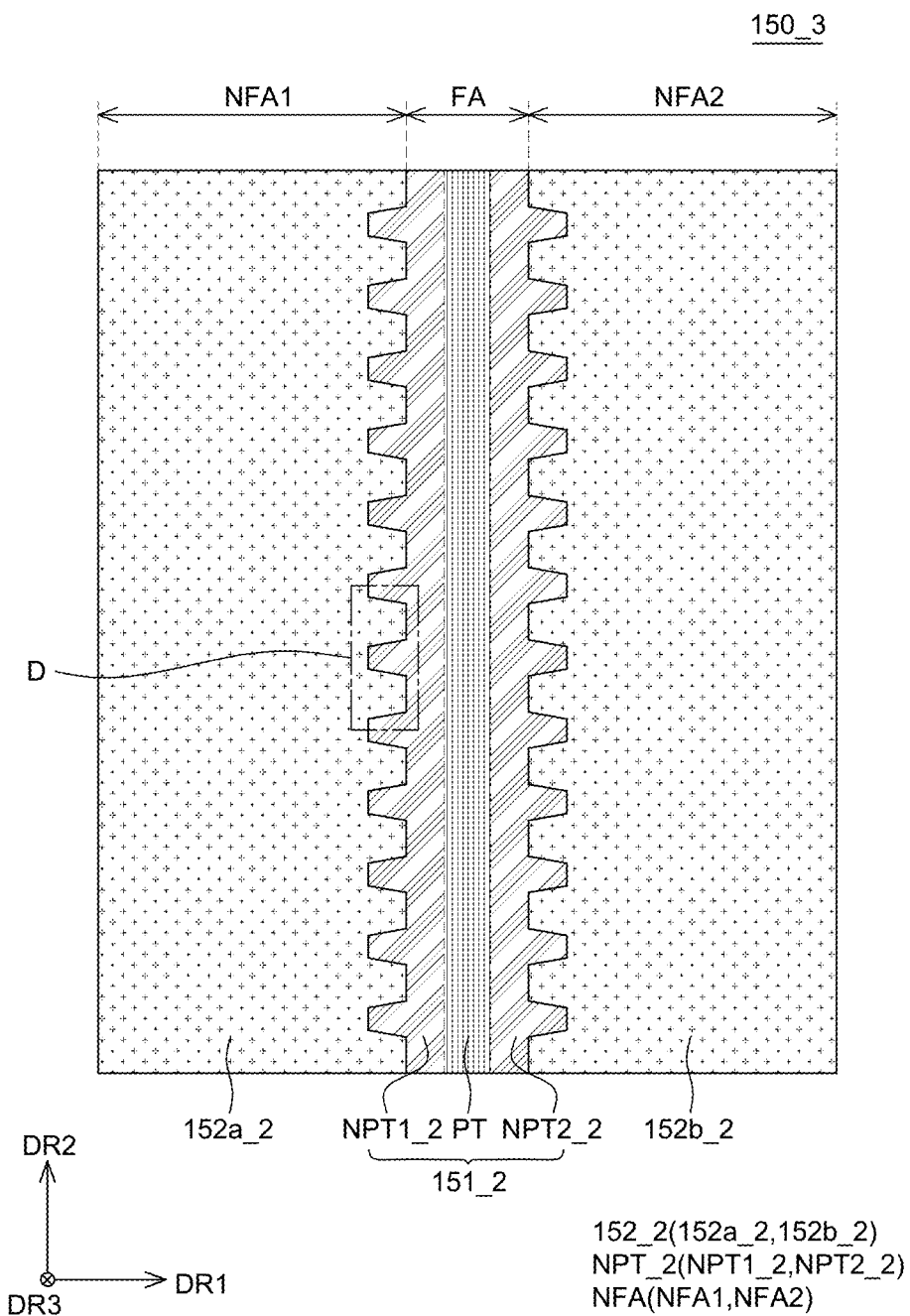
FIG. 11 is a plan view showing yet another example of the bottom plate included in the display device of FIG. 1.
Figure 12:
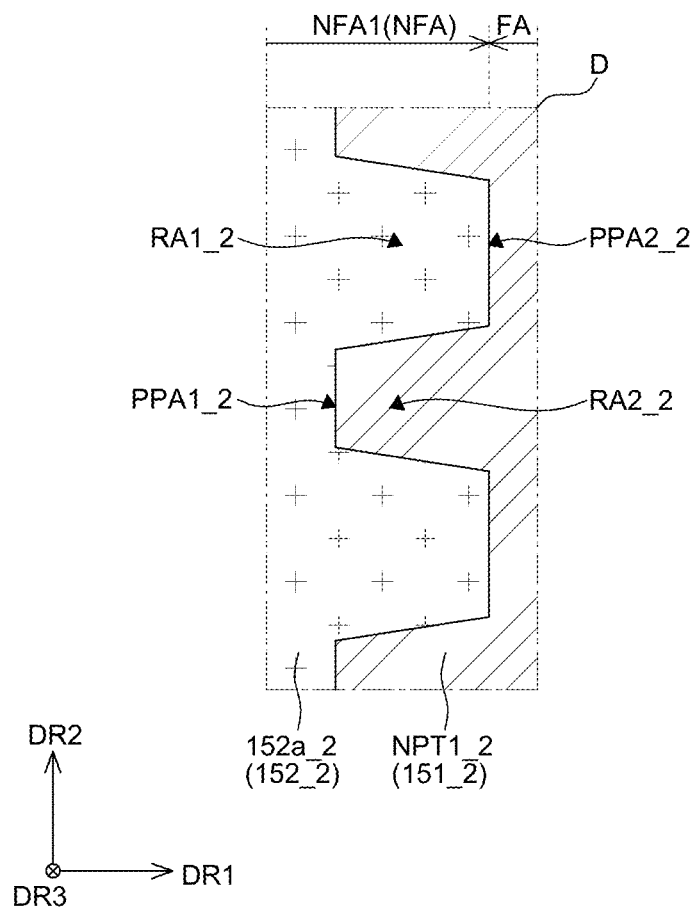
FIG. 12 is an enlarged view showing an example of a portion D of FIG. 11.

FIG. 11 is a plan view showing yet another example of the bottom plate included in the display device of FIG. 1. FIG. 12 is an enlarged view showing an example of a portion D of FIG. 11.

The components illustrated in FIG. 11 and FIG. 12 are substantially the same as those in FIG. 4 and FIG. 6. Therefore, the description thereof will be omitted or briefly provided.

Referring to FIG. 11 and FIG. 12, a bottom plate 150_3 may include a first area 151_2 and a second area 152_2.

The first area 151_2 may include the pattern part PT and a non-pattern part NPT_2 (for example, a first non-pattern part NPT1_2 and a second non-pattern part NPT2_2) disposed on both sides of the pattern part PT. Also, the second area 152_2 may include a first sub-area 152a_2 and a second sub-area 152b_2 disposed in the first non-folding area NFA1 and the second non-folding area NFA2, respectively.

According to an exemplary embodiment of the present disclosure, the non-pattern part NPT_2 (for example, the first non-pattern part NPT1_2 or the second non-pattern part NPT2_2) may include first protrusions PPA1_2. The first protrusions PPA1_2 protrude from the boundary between the folding area FA and the non-folding area NFA (for example, the first non-folding area NFA1 or the second non-folding area NFA2) toward the non-folding area NFA in the first direction DR1 (or in the direction opposite to the first direction DR1).

According to an exemplary embodiment of the present disclosure, each of the first protrusions PPA1_2 have a trapezoidal shape.

First recesses RA1_2 may be defined in a part of the non-folding area NFA (for example, the first non-folding area NFA1 or the second non-folding area NFA2) where the first protrusions PPA1_2 are not formed. For example, each of the first recesses RA1_2 may be disposed between the first protrusions PPA1_2 adjacent to each other.

According to an exemplary embodiment of the present disclosure, the second area 152_2 (for example, the first sub-area 152a_2 or the second sub-area 152b_2) may include second protrusions PPA2_2 protruding toward the folding area FA in the direction opposite to the first direction DR1 (or in the first direction DR1). The second protrusions PPA2_2 may be formed respectively corresponding to the first recesses RA1_2. Therefore, each of the second protrusions PPA2_2 may correspond in shape to each of the first recesses RA1_2. For example, each of the second protrusions PPA2_2 may have a trapezoidal shape.

Second recesses RA2_2 may be defined in a part of the non-folding area NFA (for example, the first non-folding area NFA1 or the second non-folding area NFA2) where the second protrusions PPA2_2 are not formed. For example, each of the second recesses RA2_2 may be disposed between the second protrusions PPA2_2 adjacent to each other.

The first protrusions PPA1_2 are disposed respectively corresponding to the second recesses RA2_2. Therefore, each of the second recesses RA2_2 may have trapezoidal shape corresponding to the shape of each of the first protrusions PPA1_2. However, the present disclosure is not limited thereto.

Figure 13:
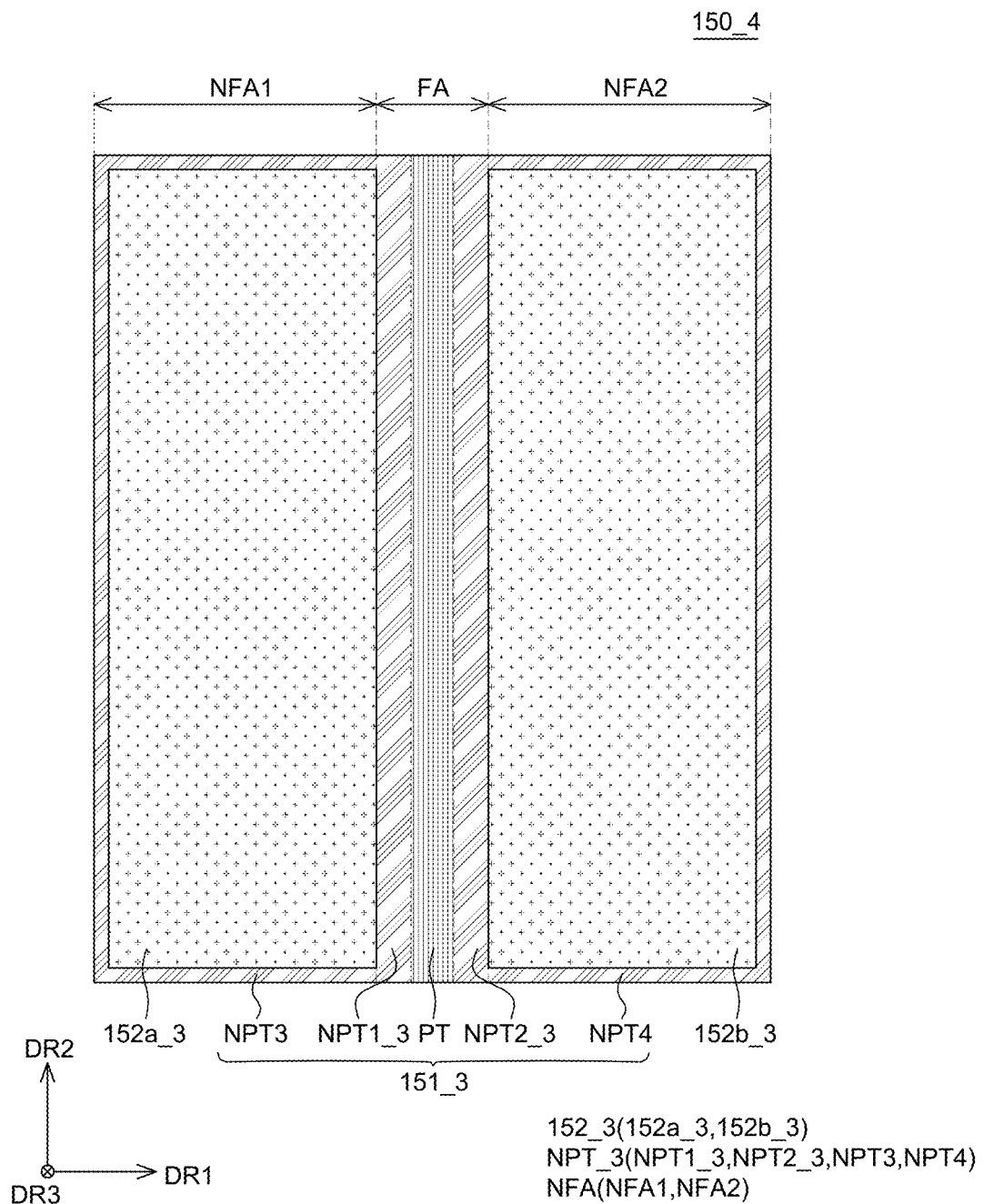
FIG. 13 is a plan view showing still another example of the bottom plate included in the display device of FIG. 1.

FIG. 13 is a plan view showing still another example of the bottom plate included in the display device of FIG. 1.

The components illustrated in FIG. 13 are substantially the same as those in FIG. 4 and FIG. 6. Therefore, the description thereof will be omitted or briefly provided.

Referring to FIG. 13, a bottom plate 150_4 may include a first area 151_3 and a second area 152_3.

The first area 151_3 may include the pattern part PT and a non-pattern part NPT_3. The non-pattern part NPT_3 may include a first non-pattern part NPT1_3 and a second non-pattern part NPT2_3 disposed on both sides of the pattern part PT.

The second area 152_3 may include a first sub-area 152a_3 and a second sub-area 152b_3 disposed in the first non-folding area NFA1 and the second non-folding area NFA2, respectively.

According to an exemplary embodiment of the present disclosure, the non-pattern part NPT_3 may further include a third non-pattern part NPT3 and a fourth non-pattern part NPT4 disposed to surround edges of the second area 152_3.

The third non-pattern part NPT3 is disposed in the first non-folding area NFA1 so as to surround edges of the first sub-area 152a_3 of the second area 152_3. For example, the third non-pattern part NPT3 may have a "⊏" shape. The third non-pattern part NPT3 may be disposed in contact with the edges of the first sub-area 152a_3 so as to surround the sides of the first sub-area 152a_3 having a rectangular shape except a side in contact with the first non-pattern part NPT1_3.

The fourth non-pattern part NPT4 is disposed in the second non-folding area NFA2 so as to surround edges of the second sub-area 152b_3 of the second area 152_3. For example, the fourth non-pattern part NPT4 may have a "⊏" shape. The fourth non-pattern part NPT4 may be disposed in contact with the edges of the second sub-area 152b_3 so as to surround the sides of the second sub-area 152b_3 having a rectangular shape except a side in contact with the second non-pattern part NPT2_3.

The first area 151_3 (for example, the non-pattern part NPT_3) includes the third non-pattern part NPT3 and the fourth non-pattern part NPT4. The third non-pattern part NPT3 and the fourth non-pattern part NPT4 are disposed to surround the edges of the second area 152_3 (for example, the outer sides of the first sub-area 152a_3 and the outer sides of the second sub-area 152b_3). Therefore, a contact area between the first area 151_3 and the second area 152_3 may increase, and thus, a connecting force between the first area 151_3 and the second area 152_3 may be enhanced. Accordingly, it is possible to suppress (or eliminate) deformation of the display device 100 (for example, the bottom plate 150_4) caused by a stress during folding or unfolding of the display device 100.

Since the bottom plate 150_4 shown in FIG. 13 does not include the above-described protrusions, a process of forming the first area 151_3 and the second area 152_3 may be further simplified.

Figure 14:
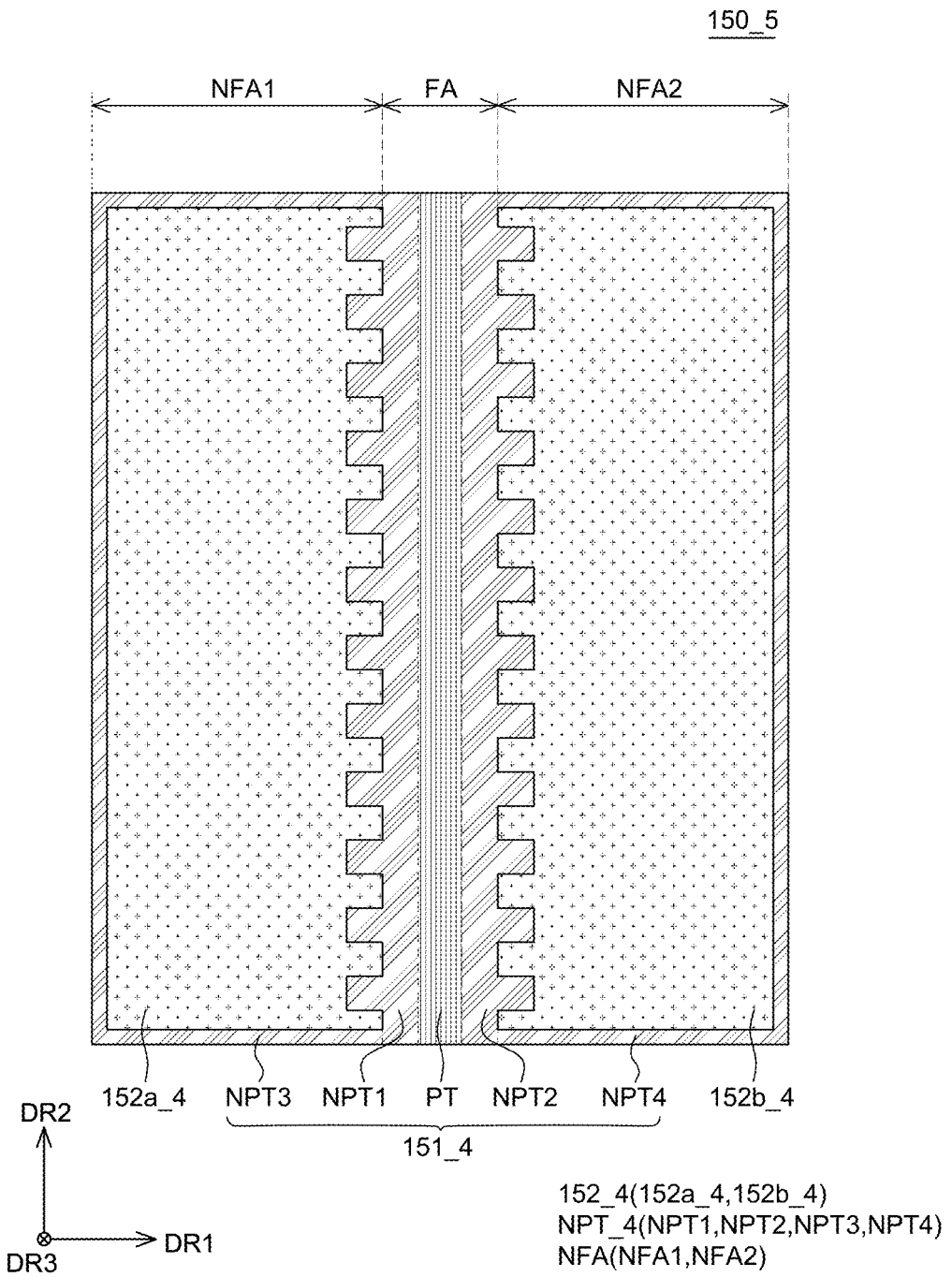
FIG. 14 is a plan view showing still another example of the bottom plate included in the display device of FIG. 1.

FIG. 14 is a plan view showing still another example of the bottom plate included in the display device of FIG. 1.

The components illustrated in FIG. 14 are substantially the same as those in FIG. 4 and FIG. 6. Therefore, the description thereof will be omitted or briefly provided.

Referring to FIG. 4, FIG. 6, and FIG. 14, a bottom plate 150_5 may include a first area 151_4 and a second area 152_4.

The first area 151_4 may include the pattern part PT and a non-pattern part NPT_4. The non-pattern part NPT_4 may include the first non-pattern part NPT1 and the second non-pattern part NPT2 disposed on both sides of the pattern part PT. The non-pattern part NPT_4 may further include the third non-pattern part NPT3 and the fourth non-pattern part NPT4 respectively disposed to surround edges of a first sub-area 151a_4 and a second sub-area 151b_4 included in the second area 152_4.

The second area 152_4 may include a first sub-area 152a_4 and a second sub-area 152b_4 disposed in the first non-folding area NFA1 and the second non-folding area NFA2, respectively.

For example, each of the first non-pattern part NPT1 and the second non-pattern part NPT2 may include the first protrusions PPA1 described above with reference to FIG. 4 and FIG. 6. Also, each of the first sub-area 152a_4 and the second sub-area 152b_4 may include the second protrusions PPA2.

The first area 151_4 (for example, the non-pattern part NPT_4) includes the third non-pattern part NPT3 and the fourth non-pattern part NPT4. The third non-pattern part NPT3 and the fourth non-pattern part NPT4 are disposed to surround edges of the second area 152_4 (for example, outer sides of the first sub-area 152a_4 and outer sides of the second sub-area 152b_4). Also, each of the first area 151_4 and the second area 152_4 includes the protrusions PPA1 and PPA2. Therefore, a contact area between the first area 151_3 and the second area 152_3 may further increase, and thus, a connecting force between the first area 151_3 and the second area 152_3 may be further enhanced. Accordingly, it is possible to more effectively suppress (or eliminate) deformation of the display device 100 (for example, the bottom plate 150_5) caused by a stress during folding or unfolding of the display device 100.

FIG. 14 illustrates that each of the protrusions PPA1 and PPA2 has a rectangular shape as described above with reference to FIG. 4 and FIG. 6. However, the present disclosure is not limited thereto. For example, each of the protrusions PPA1 and PPA2 may have a semi-circular shape or a semi-oval shape as described above with reference to FIG. 9 and FIG. 10, or may have a trapezoidal shape as described above with reference to FIG. 11 and FIG. 12.

Figure 15:
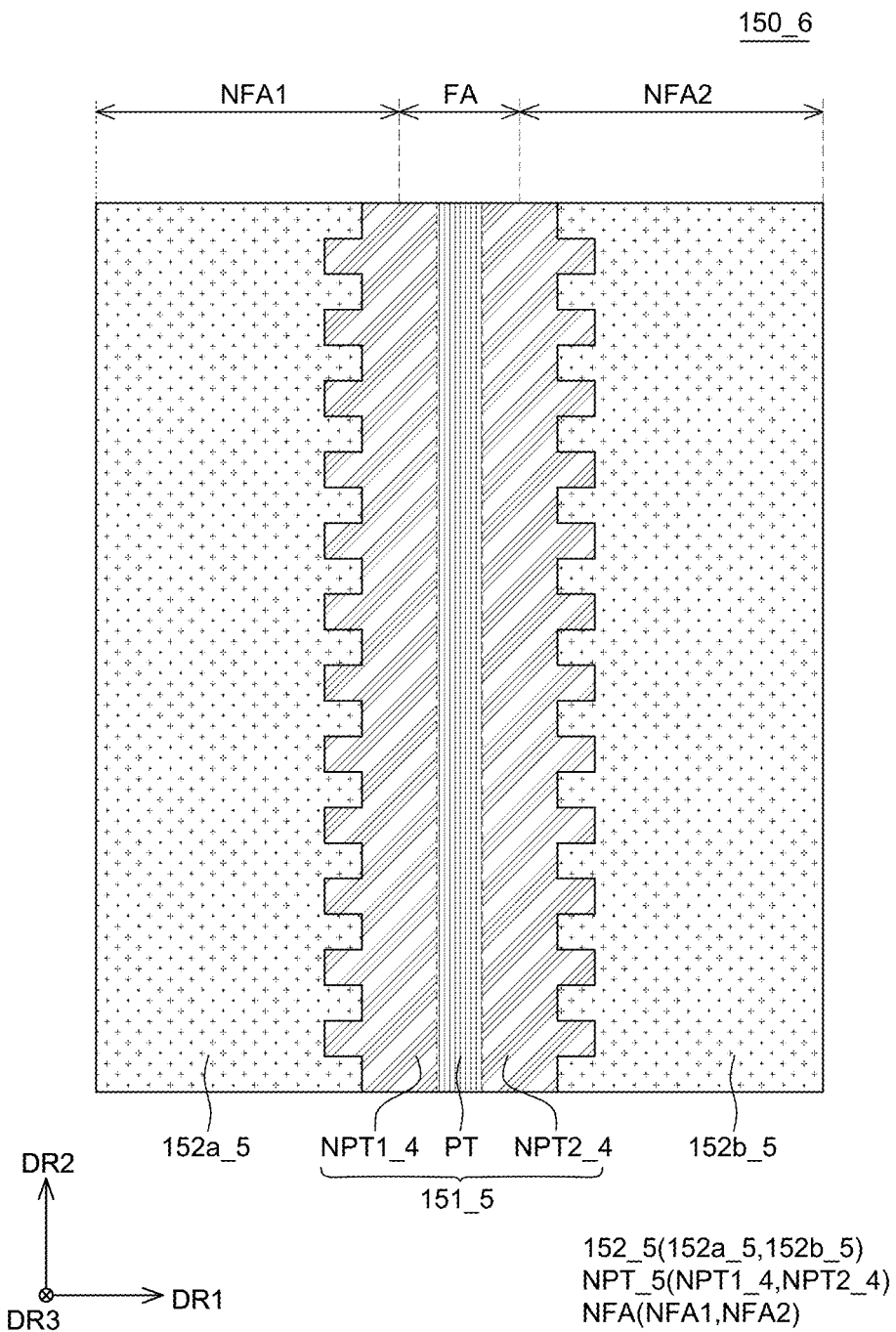
FIG. 15 is a plan view showing still another example of the bottom plate included in the display device of FIG. 1.

FIG. 15 is a plan view showing still another example of the bottom plate included in the display device of FIG. 1.

The components illustrated in FIG. 15 are substantially the same as those in FIG. 4 and FIG. 6. Therefore, the description thereof will be omitted or briefly provided.

Referring to FIG. 4, FIG. 6, and FIG. 15, a bottom plate 150_6 may include a first area 151_5 and a second area 152_5.

The first area 151_5 may include the pattern part PT and a non-pattern part NPT_5 (for example, a first non-pattern part NPT1_4 and a second non-pattern part NPT2_4) disposed on both sides of the pattern part PT. The second area 152_5 may include a first sub-area 152a_5 and a second sub-area 152b_5 disposed in the first non-folding area NFA1 and the second non-folding area NFA2, respectively.

According to an exemplary embodiment of the present disclosure, each of the first non-pattern part NPT1_4 and the second non-pattern part NPT2_4 may be disposed to overlap a part of the folding area FA and a part of the non-folding area NFA.

The first non-pattern part NPT1_4 may be disposed to overlap a part of the folding area FA and a part of the first non-folding area NFA1. For example, as shown in FIG. 15, the first protrusions PPA1 included in the first non-pattern part NPT1_4 may be formed corresponding not to the boundary between the folding area FA and the first non-folding area NFA1 but to the first non-folding area NFA1. For example, the first non-pattern part NPT1_4 may be in contact (or connection) with the first sub-area 152a_5 not at the boundary between the folding area FA and the first non-folding area NFA1 but at the first non-folding area NFA1 as shown in FIG. 15.

The second non-pattern part NPT2-4 may be disposed to overlap a part of the folding area FA and a part of the second non-folding area NFA2. For example, as shown in FIG. 15, the first protrusions PPA1 included in the second non-pattern part NPT2_4 may be formed corresponding not to the boundary between the folding area FA and the second non-folding area NFA2 but to the second non-folding area NFA2. For example, the second non-pattern part NPT2_4 may be in contact (or connection) with the second sub-area 152b_5 not at the boundary between the folding area FA and the second non-folding area NFA2 but at the second non-folding area NFA2 as shown in FIG. 15.

In the bottom plate 150_6 shown in FIG. 15 compared to the bottom plate 150 shown in FIG. 4, the non-pattern part NPT_5 of the first area 151_5 may be formed wider (for example, formed in a part of the folding area FA and a part of the non-folding area NFA). For example, a connecting force between the first area 151_5 and the second area 152_5 may be further enhanced.

Accordingly, it is possible to more effectively suppress (or eliminate) deformation of the display device 100 (for example, the bottom plate 150_6) caused by a stress during folding or unfolding of the display device 100.

As described above, the bottom plate included in the display device according to the exemplary embodiments of the present disclosure include the first area and the second area. The first area is disposed corresponding to the folding area and includes a metal material, and the second area is disposed corresponding to the non-folding area and includes a plastic material. Accordingly, a total weight of the bottom plate (or the display device) may be reduced (or minimized) compared to a case where the entire bottom plate is made of a metal material.

The first area and the second area of the bottom plate included in the display device according to the exemplary embodiments of the present disclosure are in connection (or contact) with each other through the protrusions. Therefore, a contact area between the first area and the second area increases, and thus, a contact strength (or a connecting force) between the first area and the second area may be enhanced. Accordingly, it is possible to suppress (or eliminate) deformation of the display device (or the bottom plate) caused by a stress.

The bottom plate included in the display device according to the exemplary embodiments of the present disclosure may include the second area formed in the non-display area. Also, the bottom plate may include the first area including the non-pattern part disposed to surround edges of the second area. Therefore, a contact area between the first area and the second area increases, and thus, a contact strength (or a connecting force) between the first area and the second area may be further enhanced. Accordingly, it is possible to suppress (or eliminate) deformation of the display device (or the bottom plate) caused by a stress.

The exemplary embodiments of the present disclosure can also be described as follows:

According to an aspect of the present disclosure, a display device including a folding area and a non-folding area, includes a display panel; and a bottom plate disposed under the display panel to support the display panel. The bottom plate includes different materials from each other.

The bottom plate may include a first area overlapping the folding area and a second area overlapping the non-folding area.

The first area may include a metal material, and the second area includes a plastic material.

The first area may include a pattern part including at least one hole; and a non-pattern part between the pattern part and the second area.

The non-pattern part may include a plurality of first protrusions protruding toward the non-folding area and a plurality of first recesses each disposed between the plurality of first protrusions.

The second area may include a plurality of second protrusions protruding toward the folding area and a plurality of second recesses each disposed between the plurality of second protrusions.

Each of the plurality of first protrusions may be disposed to correspond to each of the plurality of second recesses, and each of the plurality of second protrusions may be disposed to correspond to each of the plurality of first recesses.

Each of the first protrusions may have a rectangular shape.

Each of the first protrusions may have a semi-circular shape or a semi-oval shape.

Each of the first protrusions may have a rhombic shape.

The first protrusions may be spaced apart from each other at the same interval.

The non-pattern part may be disposed to surround edges of the second area.

The first protrusions may be disposed to overlap the non-folding area, and the non-pattern part excluding the first protrusions may be disposed to overlap only the folding area.

The first protrusions may be disposed to overlap the non-folding area, and the non-pattern part excluding the first protrusions may be disposed to overlap a part of the folding area and a part of the non-folding area.

The display device may further include a top plate between the display panel and the bottom plate.

The non-folding area may include a first non-folding area and a second non-folding area disposed on both sides of the folding area, and the second area may include a first sub-area disposed to overlap the first non-folding area and a second sub-area disposed to overlap the second non-folding area.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The scope of the claims are not limited by the present disclosure, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a display device having a folding area and a non-folding area, the display device including:
    a display panel; and
    a bottom plate disposed under the display panel and supporting the display panel,
wherein the bottom plate includes at least two different materials from each other,
wherein the bottom plate includes a first area overlapping the folding area of the display device and a second area overlapping the non-folding area of the display device,
wherein the first area includes a pattern part including at least one hole and a non-pattern part between the pattern part and the second area,
wherein the non-pattern part includes a plurality of first protrusions protruding toward the non-folding area of the display device,
wherein the plurality of first protrusions overlap the non-folding area of the display device, and
wherein a portion of the non-pattern part excluding the plurality of first protrusions overlaps a part of the folding area and a part of the non-folding area of the display device.

2. The display device according to claim 1, wherein the first area includes a metal material, and the second area includes a plastic material.

3. The display device according to claim 1, wherein the non-pattern part further includes a plurality of first recesses disposed between the plurality of first protrusions.

4. The display device according to claim 3, wherein the second area includes a plurality of second protrusions protruding toward the folding area of the display device and a plurality of second recesses disposed between the plurality of second protrusions.

5. The display device according to claim 4, wherein each of the plurality of first protrusions is disposed to correspond to each of the plurality of second recesses, and
wherein each of the plurality of second protrusions is disposed to correspond to each of the plurality of first recesses.

6. The display device according to claim 3, wherein each of the plurality of first protrusions has a rectangular shape.

7. The display device according to claim 3, wherein each of the plurality of first protrusions has a semi-circular shape or a semi-oval shape.

8. The display device according to claim 3, wherein each of the plurality of first protrusions has a rhombic shape.

9. The display device according to claim 3, wherein the plurality of first protrusions are spaced apart from each other at a same interval.

10. The display device according to claim 1, wherein the non-pattern part surrounds edges of the second area.

11. The display device according to claim 1, further comprising:
a top plate between the display panel and the bottom plate.

12. The display device according to claim 1, wherein the non-folding area of the display device includes a first non-folding area and a second non-folding area disposed on both sides of the folding area of the display device, and
wherein the second area of the bottom plate includes a first sub-area overlapping the first non-folding area of the display device and a second sub-area overlapping the second non-folding area of the display device.

* * * * *